(12) United States Patent
Toda et al.

(10) Patent No.: US 11,801,897 B2
(45) Date of Patent: Oct. 31, 2023

(54) FRAME MEMBER

(71) Applicant: NIPPON STEEL CORPORATION, Tokyo (JP)

(72) Inventors: Yuri Toda, Tokyo (JP); Hiroaki Kubota, Tokyo (JP); Hiroyuki Kawata, Tokyo (JP); Daisuke Maeda, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 750 days.

(21) Appl. No.: 16/965,922

(22) PCT Filed: Oct. 9, 2019

(86) PCT No.: PCT/JP2019/039758
§ 371 (c)(1),
(2) Date: Jul. 29, 2020

(87) PCT Pub. No.: WO2020/075739
PCT Pub. Date: Apr. 16, 2020

(65) Prior Publication Data
US 2021/0070368 A1 Mar. 11, 2021

(30) Foreign Application Priority Data
Oct. 12, 2018 (JP) ................. 2018-193175
Feb. 15, 2019 (JP) ................. 2019-025366

(51) Int. Cl.
B62D 21/05 (2006.01)
B62D 21/15 (2006.01)
(Continued)

(52) U.S. Cl.
CPC ............. *B62D 21/15* (2013.01); *B60R 19/02* (2013.01); *B62D 25/025* (2013.01); *B62D 25/04* (2013.01)

(58) Field of Classification Search
CPC ... B62D 21/15; E04C 3/07; E04C 3/40; E04C 3/005; E04B 2/967
See application file for complete search history.

(56) References Cited

U.S. PATENT DOCUMENTS

2004/0201256 A1* 10/2004 Caliskan ................. F16F 7/12
296/193.06
2013/0048151 A1 2/2013 Kawamura et al.
(Continued)

FOREIGN PATENT DOCUMENTS

CN 102770568 B 3/2014
JP 2011-68979 A 4/2011
(Continued)

OTHER PUBLICATIONS

"Vickers hardness test—Test method", JIS Z 2244, 2009, total 52 pages.
(Continued)

*Primary Examiner* — Babajide A Demuren
(74) *Attorney, Agent, or Firm* — Birch, Stewart, Kolasch & Birch, LLP

(57) ABSTRACT

In a frame member, the hardness of a sheet-thickness-direction central section in a portion where a softening layer is provided is greater than or equal to 400 Hv, the softening layer has hardness smaller by at least 10 Hv than the hardness of the sheet-thickness-direction central section in the portion where the softening layer is provided, the thickness of the softening layer is greater than or equal to 2% of the sheet thickness but smaller than 20% of the sheet thickness, the hardness of the softening layer at the surface is greater than or equal to 0.5 times the hardness of the sheet-thickness-direction central section but smaller than 0.9 times the hardness of the sheet-thickness-direction central section, the softening layer has a first hardness changing area and a second hardness changing area, an absolute value
(Continued)

ΔHv1 of a change in hardness of the first hardness changing area in the sheet thickness direction is greater than an absolute value ΔHv2 of a change in hardness of the second hardness changing area in the sheet thickness direction, and R/t≤2.5 is satisfied, where R represents the bending radius of the corner section, and t represents the sheet thickness of the corner section.

7 Claims, 18 Drawing Sheets

(51) Int. Cl.
    *B60R 19/02*     (2006.01)
    *B62D 25/02*     (2006.01)
    *B62D 25/04*     (2006.01)

(56) References Cited

U.S. PATENT DOCUMENTS

2013/0333190 A1    12/2013    Mizumura et al.
2018/0009019 A1*    1/2018    Bassan .................... B32B 15/14
2019/0390295 A1    12/2019    Nakagawa et al.
2020/0094885 A1    3/2020    Kubo et al.

FOREIGN PATENT DOCUMENTS

| WO | WO 2012/118223 A1 | 9/2012 | |
| WO | WO 2018/174082 A1 | 9/2018 | |
| WO | WO 2018/179839 A1 | 10/2018 | |
| WO | WO-2021089800 A1 * | 5/2021 | ........... B21D 22/022 |

OTHER PUBLICATIONS

Written Opinion of the International Searching Authority for PCT/JP2019/039758 (PCT/ISA/237) dated Dec. 3, 2019.

* cited by examiner

FRAME MEMBER

TECHNICAL FIELD

The present invention relates to a frame member.

The present application claims priority based on Japanese Patent Application No. 2018-193175 filed in Japan on Oct. 12, 2018 and Japanese Patent Application No. 2019-025366 filed in Japan on Feb. 15, 2019, and the contents thereof are incorporated herein.

BACKGROUND ART

In related art, a sheet member made of metal is processed into a member having a predetermined cross-sectional shape, and the processed member is used as a frame member of an automobile. Such a frame member needs to achieve weight reduction and have sufficient load resistance. A material having high strength, such as a high-tensile steel sheet, is therefore used in some cases in recent years. On the other hand, when impact resulting from collision acts on a product including the frame member, the frame member needs to behave in a desired deformation mode to efficiently absorb the impact.

A frame member made of a high-strength material, such as a high-tensile steel sheet, needs to have both improved deformation capability and load resistance. For example, Patent Document 1 describes that a technology for partially changing the hardness of a member is used to provide a low-hardness area and a high-hardness area in a product made of sheet metal.

CITATION LIST

Patent Documents

Patent Document 1: PCT International Publication No. WO2012/118223

SUMMARY OF INVENTION

Problems to be Solved by the Invention

When a frame member the hardness of which is partially changed, such as the frame member disclosed in Patent Document 1 described above, however, simply has a softening layer that improves the deformation capability, further improvement in load resistance is limited, while the deformation capability is ensured. That is, when a high-tensile steel sheet is used as the material of the frame member, higher-level deformation capability and load resistance are both required.

The present invention has been made in view of the problem described above. An object of the present invention is to provide a novel, improved frame member that allows assurance of deformation capability and improvement in load resistance at the time of collision.

Means for Solving the Problem

The summary of the present invention is as follows:

(1) A first aspect of the present invention relates to a frame member including a corner section extending in a lengthwise direction and a side wall section extending from a widthwise end of the corner section. A softening layer is provided in a sheet thickness direction so as to present on a surface of the corner section on at least one of a bending inner side and a bending outer side. The softening layer extends along the side wall section from the corner section to an area having a length longer than or equal to half a widthwise length of the side wall section. Hardness of a sheet-thickness-direction central section in a portion where the softening layer is provided is greater than or equal to 400 Hv, and the softening layer is an area having hardness smaller by at least 10 Hv than the hardness of the sheet-thickness-direction central section in the portion where the softening layer is provided. A thickness of the softening layer is greater than or equal to 2% of the sheet thickness in the portion where the softening layer is provided but smaller than 20% of the sheet thickness in the portion where the softening layer is provided. The hardness of the softening layer at the surface is greater than or equal to 0.5 times the hardness of the sheet-thickness-direction central section in the portion where the softening layer is provided but smaller than 0.9 times the hardness of the sheet-thickness-direction central section in the portion where the softening layer is provided. The softening layer has a first hardness changing area that is an area extending from the surface to 40% of the thickness of the softening layer in the sheet thickness direction and a second hardness changing area that is an area different from the first hardness changing area out of the softening layer. An absolute value ΔHv1 of a change in hardness of the first hardness changing area in the sheet thickness direction is greater than an absolute value ΔHv2 of a change in hardness of the second hardness changing area in the sheet thickness direction. R/t≤2.5 is satisfied, where R represents a bending radius of the corner section, and t represents the sheet thickness of the corner section.

(2) In the frame member described in the aforementioned item (1), the absolute value ΔHv1 of a change in hardness of the first hardness changing area in the sheet thickness direction may be greater than or equal to 100 Hv but smaller than 200 Hv.

(3) In the frame member described in the aforementioned item (1) or (2), the softening layer may be provided on the bending outer side of the corner section.

(4) In the frame member described in any one of the aforementioned items (1) to (3), the softening layer may be provided both on the bending inner side and the bending outer side of the corner section.

(5) In the frame member described in any one of the aforementioned items (1) to (4), the side wall section may extend from one end of the corner section, the frame member may further include a flat sheet section extending from another end of the corner section, and the softening layer may extend along the flat sheet section from the corner section to an area having a length longer than or equal to half a widthwise length of the flat sheet section.

(6) In the frame member described in any one of the aforementioned items (1) to (5), the side wall section may extend from one end of the corner section, the frame member may further include a flat sheet section extending from another end of the corner section, and hardness in a position at a depth of 70 m from a surface of the flat sheet section in the sheet thickness direction at a center of the flat sheet section may be smaller than or equal to 0.9 times the hardness in the central section in the sheet thickness direction.

(7) In the frame member described in the aforementioned item (6), the surface of the flat sheet section may be a surface of the flat sheet section that is a surface continuously connected to the bending inner side of the corner section.

Effects of the Invention

The present invention provides a frame member that allows improvement both in deformation capability and load resistance at the time of collision.

EMBODIMENT OF THE INVENTION

Figure 1:
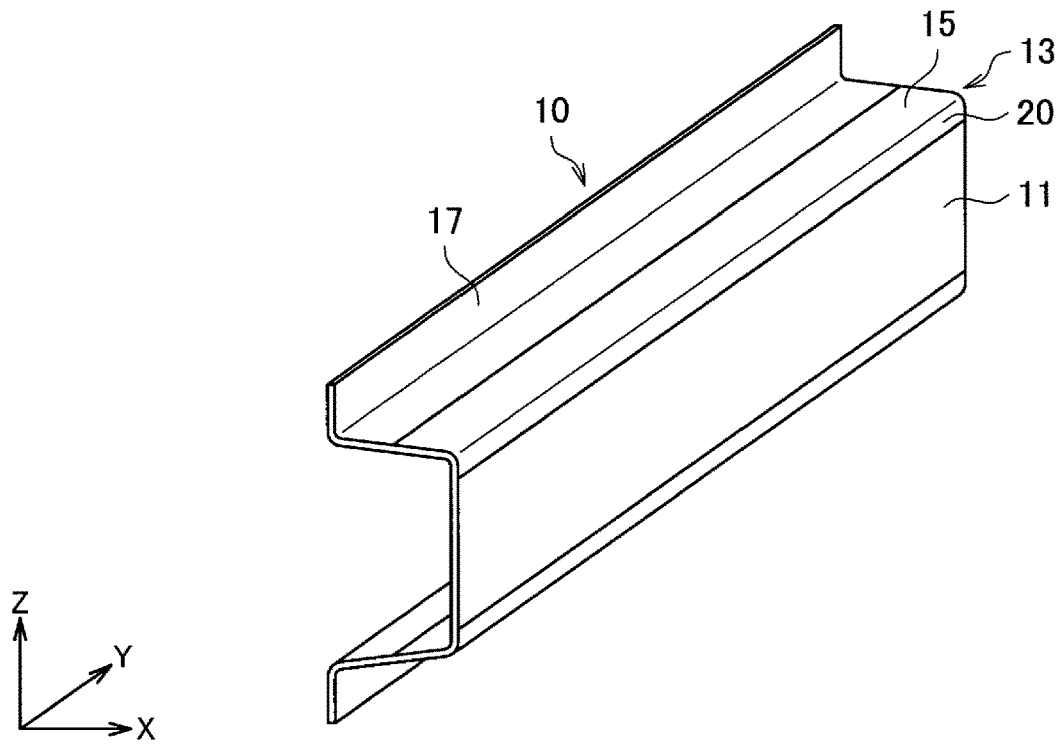
FIG. 1 is a partial perspective view showing an example of a frame member according to a first embodiment of the present invention.

Preferable embodiments of the present invention will be described below in detail with reference to the accompanying drawings. In the present specification and drawings, components having substantially the same functional configuration have the same reference character and will not be redundantly described.

1. First Embodiment

[Overall Structure of Frame Member]

A partial structure of an example of a frame member according to a first embodiment of the present invention will first be described with reference to FIG. 1. FIG. 1 is a partial perspective view showing an example of the frame member according to the present embodiment. A frame member 10 is a member that extends in a direction Y shown in FIG. 1 as a lengthwise direction and has a roughly hat-shaped lengthwise cross-sectional shape (in plane X-Z) that opens in a direction X. The frame member 10 includes by way of example a flat sheet section 11, side wall sections 15 each as a wall section extending from the flat sheet section 11 via a corner section 13, and flange sections 17, which are each the bent section of the side wall section 15 bent at the end opposite the corner section 13. In the frame member 10, at least the corner section 13 and the side wall section 15 each further include a softening layer 20, which will be described later.

The frame member 10 is fixed or linked to another member to form the entirety or part of a product. For example, when a load acts on the frame member 10 in a direction perpendicular to the lengthwise direction (direction X or Z in FIG. 1), the frame member 10 can undergo bending deformation. Further, for example, when a load acts on the frame member 10 in the lengthwise direction (direction Y in FIG. 1), the frame member 10 can undergo deformation associated with axial crushing.

The frame member 10 can be formed of any of a variety of sheet members made of metal. In particular, the frame member 10 can be formed of a steel sheet. The steel sheet is made, for example, of steel having a tensile strength greater than or equal to 1470 MPa (for example, as large as 1.5 GPa, as large as 1.8 GPa, or greater). Examples of the thickness of the steel sheet used to form the frame member 10 may include about 0.5 to 3.5 mm or about 1.0 to 2.9 mm. The frame member 10 can be formed by applying any of a variety of known processing technologies to a sheet-shaped member made of metal (blank).

[Configuration of Corner Section of Frame Member]

Figure 2:
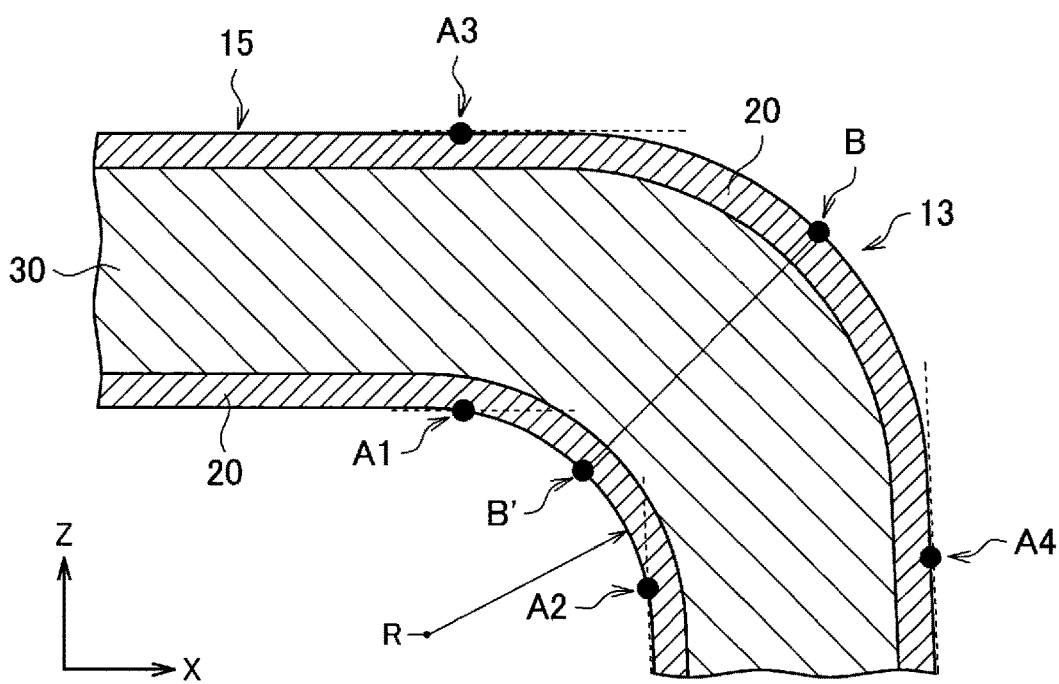
FIG. 2 is a cross-sectional view of an area including a corner section of the frame member according to the first embodiment taken along a plane X-Z.
Figure 3:
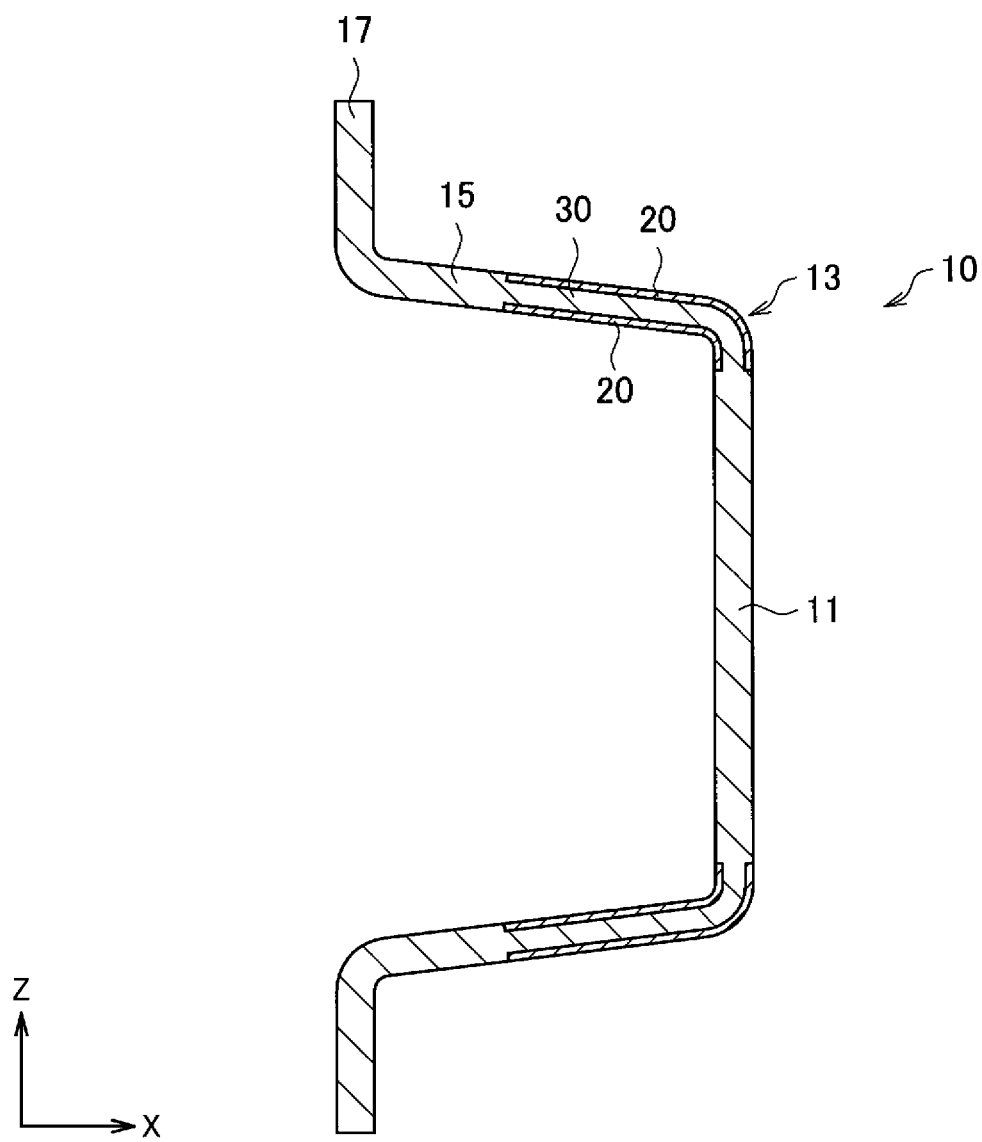
FIG. 3 is a cross-sectional view of the frame member according to the first embodiment taken along the plane X-Z.
Figure 4:
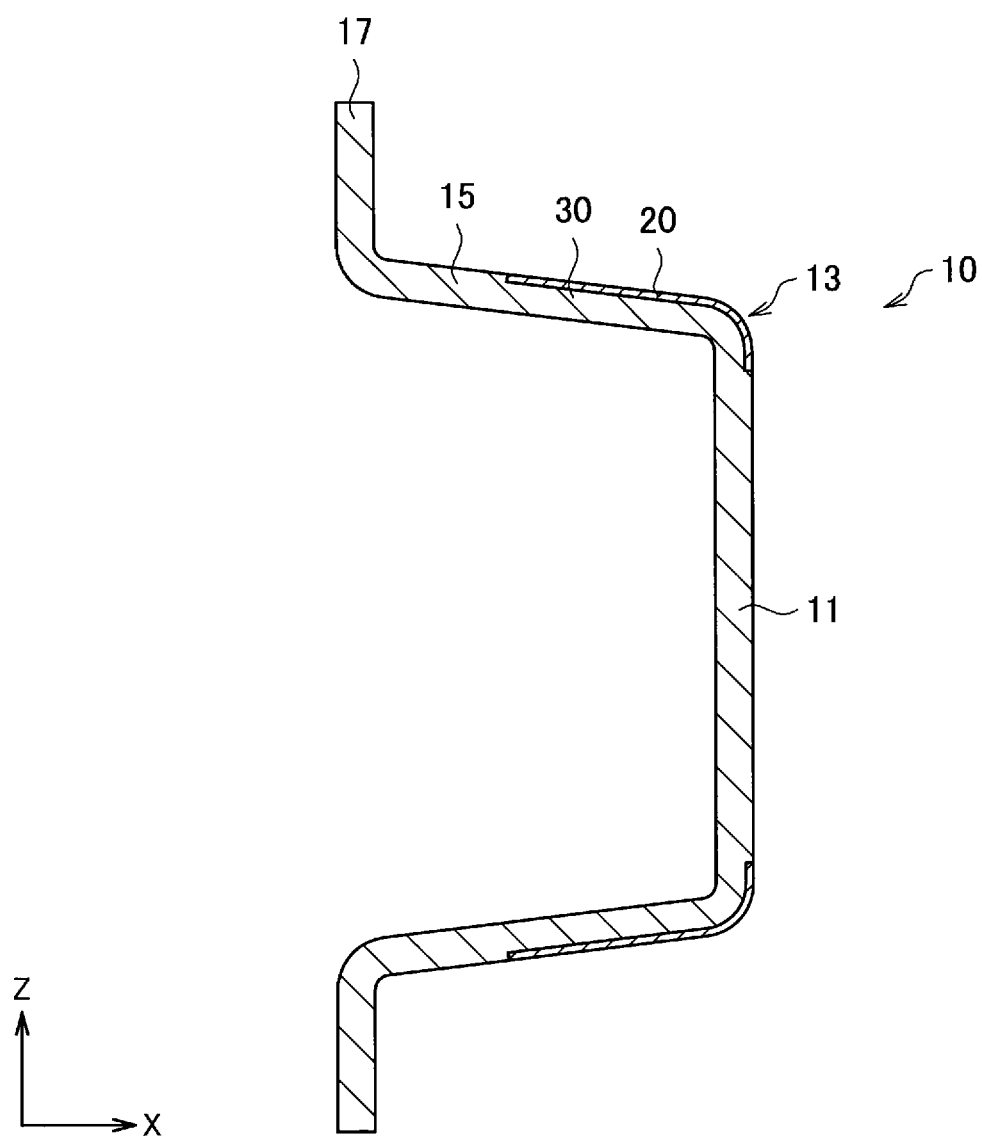
FIG. 4 is a cross-sectional view of the frame member according to the first embodiment taken along the plane X-Z.
Figure 5:
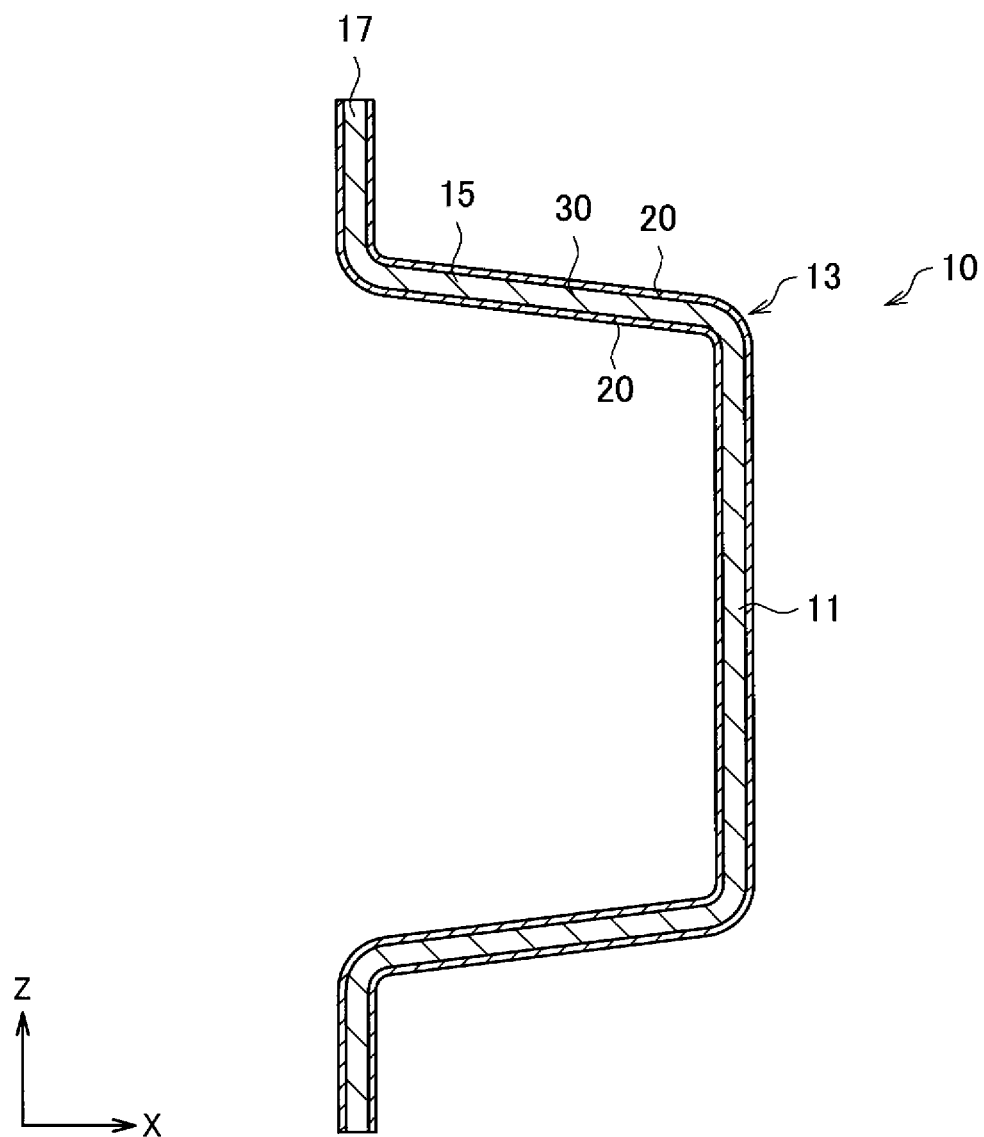
FIG. 5 is a cross-sectional view of the frame member according to the first embodiment taken along the plane X-Z.

The configuration of an area including the corner section 13 according to the present embodiment will next be described with reference to FIGS. 2 to 5, 6A, and 6B. FIG. 2 is a cross-sectional view of the area including the corner section 13 according to the present embodiment taken along the plane X-Z. FIGS. 3 to 5 are each a cross-sectional view of the frame member according to the present embodiment taken along the plane X-Z. The corner section 13 is a bent section present between the flat sheet section 11 and each of the side wall sections 15 and has a predetermined bending radius R, which will be described later. The corner section 13 is formed in the area defined by R-stop points A1 and A2, which are present on the bending inner side, and R-stop points A3 and A4, which are present on the bending outer side, in the cross-sectional view taken along the plane X-Z, as shown in FIG. 2.

The bending radius R is set at a value that satisfies Expression R/t≤2.5, where t represents the sheet thickness of the corner section 13. When R/t≤2.5 is satisfied, the side wall sections 15 are unlikely to warp in the bending deformation at the time of collision, whereby the load resistance of the corner section 13 particularly in a stroke initial stage increases. Further, the high load resistance can be maintained also in stroke intermediate and final stages accordingly. Moreover, in conjunction with the effect of forming the softening layer 20, which will be described later, at the corner section 13, excellent load resistance can be achieved particularly in the stroke final stage, whereby the deformation capability and load resistance at the time of collision can be improved.

The lower limit of R/t is not limited to a specific value and preferably satisfies R/t≥0.5, more preferably, R/t≥0.9 from the viewpoint of formability. The bending radius R is obtained by determining three points on the bending inner side from an image of a cross section of the corner section 13, the R-stop points A1 and A2 and the bending center point of the corner section 13 (the point located at the middle of the corner section 13 and corresponding to half the distance between the R-stop points A1 and A2), and determining the curvature based on the three points by using a known mathematical approach.

To manufacture the frame member 10 having the tensile strength of 1470 MPa or greater (for example, as large as 1.5 GPa, as large as 1.8 GPa, or greater), a hot stamp method is preferably used to achieve the corner section 13 that satisfies R/t≤2.5.

The corner section 13 includes the softening layer 20. The softening layer 20 can be provided on a surface of the frame member 10 that is the surface on one of the bending inner and outer sides of the corner section 13 or the surfaces both on the bending inner and outer sides of the corner section 13. In particular, the softening layer 20 can be provided on the bending outer side of the corner section 13, as shown in FIG. 4. Instead, the softening layer 20 can be provided on the entire surface of the frame member 10, as shown in FIG. 5.

[Configuration of Side Wall Sections of Frame Member]

The side wall sections 15 each extend from an R-stop-containing end portion of the corner section 13 in a direction perpendicular to the sheet thickness direction. An end portion of each of the side wall sections 15 that is the end portion opposite the corner section 13 may be bent outward, and the flange section 17 may extend from the end portion via the bent portion. That is, the X-Z cross-section of the frame member 10 defined in FIG. 1 can have a roughly hat-like shape.

Figure 6A:
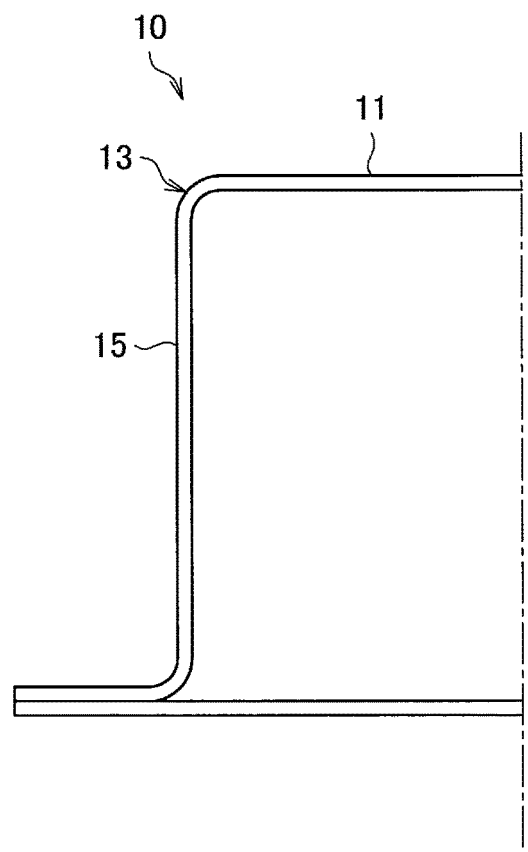
FIG. 6A is a cross-sectional view showing the shape of the frame member according to the first embodiment in a three-point bending simulation.
Figure 6B:
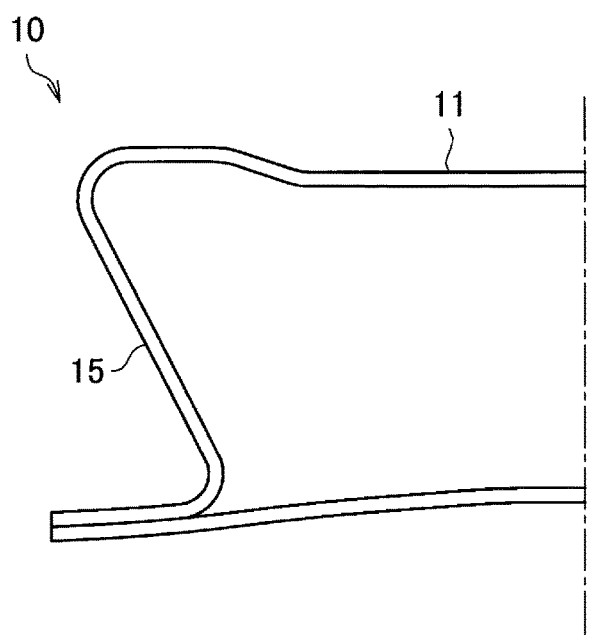
FIG. 6B is a cross-sectional view showing the shape of the frame member according to the first embodiment in the three-point bending simulation.

The side wall section 15 also includes the softening layer 20, as does the corner section 13. On the side wall section 15, the softening layer 20 extends from the R stop that is the portion where the corner section 13 is connected to the side wall section 15 over the area having a length longer than or equal to half the widthwise length of the side wall section 15, as shown in FIG. 3. The reason why the softening layer 20 extends over the area having a length longer than or equal to half the widthwise length of the side wall section 15 is based on the result of a three-point bending simulation performed by the present inventors on the frame member 10 and shown in FIGS. 6A and 6B. That is, the three-point bending simulation is performed on the initial state shown in FIG. 6A, and FIG. 6B shows that the corner section 13 and the portion from the R-stop to the area having a length equal to half the widthwise length of the side wall section 15 each have maximum principal strain greater than the strain of the other portions. Providing at least the portion from the R-stop to the area having a length equal to half the widthwise length of the side wall section 15 with the softening layer 20 therefore allows breakage to be unlikely to occur in the area described above at the time of collision.

The widthwise direction of the side wall sections 15 is the direction in which the side wall sections 15 extend in a case where the lengthwise direction of the frame member 10 (direction Y in FIG. 1) coincides with the lengthwise direction of the side wall sections 15 and which is a direction perpendicular to the lengthwise direction (roughly, direction X in FIG. 1). The widthwise length of each the side wall sections 15 refers to the distance from an R stop of the corner section 13 that is the R stop facing the side wall section 15 in the cross section taken along the plane X-Z to an R stop of the bent portion between the side wall section 15 and the flange section 17 that is the R stop facing the side wall section 15.

[Configuration of Softening Layer]

The softening layer 20 is formed on the surface of the frame member 10 at least at the corner sections 13 and the side wall sections 15. The softening layer 20 may be continuously or partially formed along the lengthwise direction of the frame member 10 (direction Y in FIG. 1). The softening layer 20 is formed from the surface of the frame member 10 to a predetermined depth in the sheet thickness direction. The thickness of the softening layer 20 on the frame member 10 according to the present embodiment is greater than or equal to 2% of the sheet thickness of the frame member 10 but smaller than 20% thereof. The sheet thickness used herein refers to the overall thickness in the sheet thickness direction of the frame member 10, including the softening layer 20 and a sheet-thickness-direction central section 30, which will be described later.

When the thickness of the softening layer 20 is greater than or equal to 20% of the sheet thickness of the frame member 10, the ratio of the softening layer 20 to the frame member 10 increases, so that the frame member 10 cannot maintain a withstanding load that the frame member 10 needs to have. The thickness of the softening layer 20 is preferably smaller than or equal to 17% of the sheet thickness of the frame member 10, more preferably, smaller than or equal to 14% of the sheet thickness of the frame member 10.

On the other hand, when the thickness of the softening layer 20 is smaller than 2% of the sheet thickness of the frame member 10, the ratio of the softening layer 20 to the frame member 10 is small, so that the deformation capability is not fully provided. The thickness of the softening layer 20 is preferably greater than or equal to 5% of the sheet thickness of the frame member 10, more preferably, greater than or equal to 8% of the sheet thickness of the frame member 10.

A sheet-thickness-direction central portion of the frame member 10 (the sheet-thickness-direction area of the frame member 10 excluding the softening layer 20) forms the sheet-thickness-direction central section 30. The softening layer 20 is an area having hardness lower than the hardness of the sheet-thickness-direction central section 30 by at least 10 Hv.

The hardness of the softening layer 20 on the surface of the frame member 10 is greater than or equal to 0.5 times the hardness of the sheet-thickness-direction central section 30 but smaller than 0.9 times the hardness of the sheet-thickness-direction central section 30. The surface of the frame member 10 refers to the surface of the base material of the frame member 10 excluding an applied film and a plated layer thereon. The hardness of the surface of the frame member 10 is measured by performing a Vickers hardness test specified in JIS Z 2244:2009 on a cross section of the base material. The measurement is so performed that a measurement point is located at a depth smaller than or equal to 20 μm from the surface of the base material and the indentation has a depth smaller than or equal to 10 μm. When the hardness of the surface is smaller than 0.5 times the hardness of the sheet-thickness-direction central section 30, the surface layer of the frame member is too soft to improve the withstanding load at the time of collision, in particular, in the stroke final stage. The softening layer 20 on the surface of the frame member 10 preferably has hardness greater than or equal to 0.6 times the hardness of the sheet-thickness-direction central section 30.

On the other hand, when the hardness of the surface is greater than or equal to 0.9 times the hardness of the sheet-thickness-direction central section 30, it is difficult to sufficiently improve the deformation capability. The softening layer 20 on the surface of the frame member 10 preferably has hardness smaller than 0.8 times the hardness of the sheet-thickness-direction central section 30.

The hardness of the sheet-thickness-direction central section 30 is greater than or equal to 400 Hv in Vickers hardness. When the frame member is made of steel having a Vickers hardness of 400 Hv or greater, it is difficult for the frame member to maintain the deformation capability at the time of collision. That is, when the sheet-thickness-direction central section 30 of the frame member 10 has a Vickers hardness of 400 Hv or greater, the softening layer 20 according to the present embodiment noticeably improves the deformation capability. The Vickers hardness of the sheet-thickness-direction central section 30 of the frame member 10 is preferably greater than or equal to 500 Hv, more preferably, greater than or equal to 600 Hv.

The upper limit of the hardness of the sheet-thickness-direction central section 30 is not particularly specified and is preferably 800 HV, more preferably, 700 Hv in view of the formability and other factors of the frame member 10.

For example, within the above-mentioned range of the hardness of the sheet-thickness-direction central section 30, the hardness of the softening layer 20 on the surface of the frame member 10 can be greater than or equal to 250 Hv in Vickers hardness. Instead, within the above-mentioned range of the hardness of the sheet-thickness-direction central section 30, the hardness of the softening layer 20 on the surface of the frame member 10 can be greater than or equal to 500 Hv in Vickers hardness. A method for measuring the hardness of the surface of the area formed of the softening layer 20 of the frame member 10 and the hardness of the sheet-thickness-direction central section 30 will be described later in detail.

The softening layer 20 can be formed on the surface of the frame member 10 by applying a variety of known surface processing, surface finishing, or thermal treatment technologies. The method for forming the softening layer 20 may, for example, be a partial tempering using laser heating or high-frequency heating performed on the areas corresponding to the corner sections 13 and the side wall sections 15. The frame member 10 including the softening layers 20 in predetermined areas can be formed by processing a blank having the softening layers described above formed on the surface layer in advance.

Figure 7:
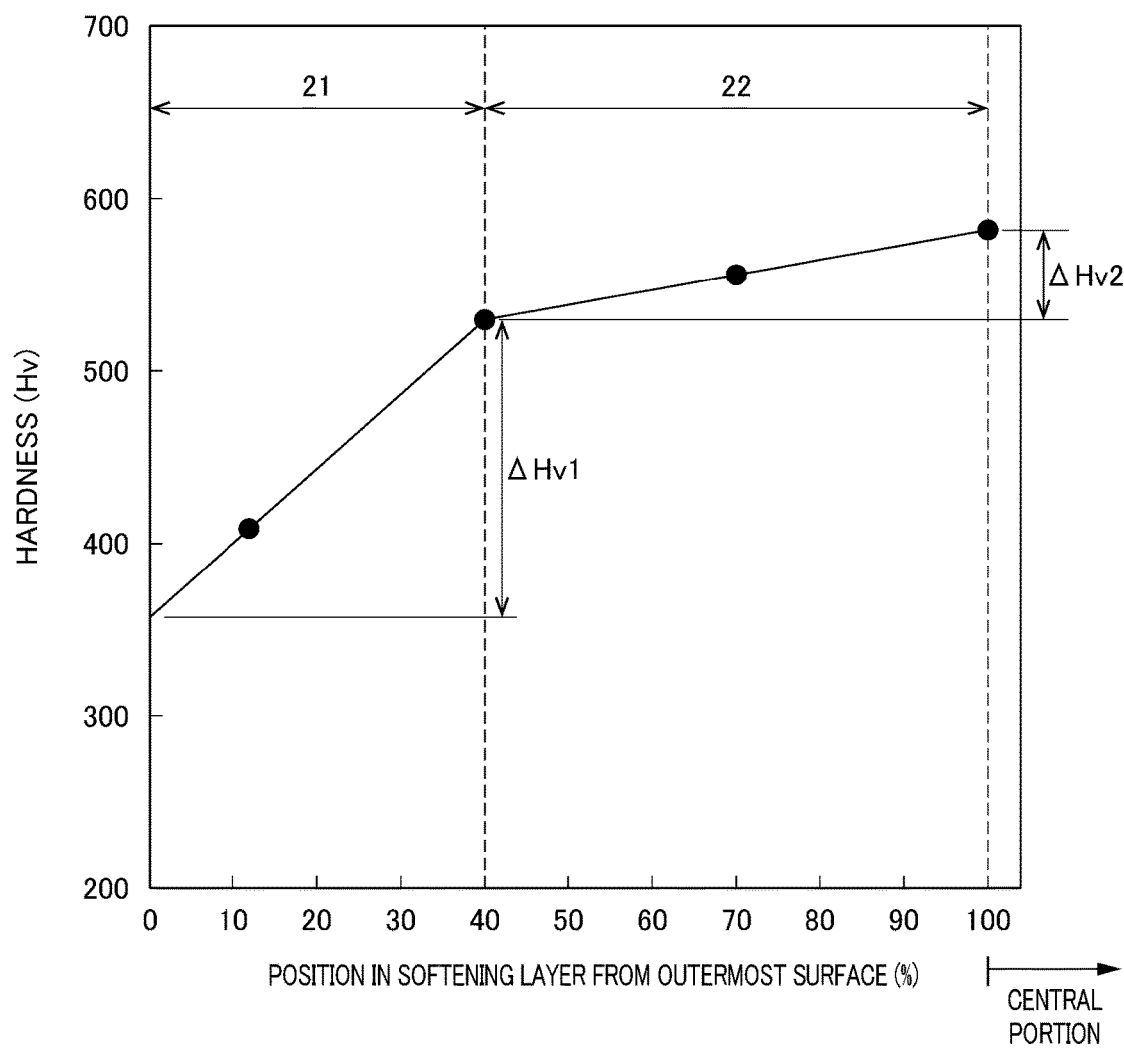
FIG. 7 shows an example of a change along the line B-B' in FIG. 2 in the hardness of the softening layer of the frame member according to the first embodiment.

FIG. 7 shows an example of a change along the line B-B' in FIG. 2 in the hardness of the softening layers 20 of the frame member 10 according to the present embodiment. FIG. 7 shows the result of an experiment in which the frame member 10 according to the present embodiment is so produced in hot press using steel for hot stamping that the steel is formed in a hat shape having a tensile strength as large as 2.0 GPa and the results of measurement of the sheet-thickness-direction Vickers hardness of a softening layer 20 are plotted in the form of a graph. The softening layers 20 each have a first hardness changing area 21, which is present in the portion facing the surface of the frame member 10, and a second hardness changing area 22, which is present between the first hardness changing area 21 and the sheet-thickness-direction central section 30, as shown in FIG. 7. The second hardness changing area 22 is an area of the softening layer 20 that is the area excluding the first hardness changing area 21. The first hardness changing area 21 and the second hardness changing area 22 are each an area where the sheet-thickness-direction hardness changes at a predetermined gradient, and the first hardness changing area 21 and the second hardness changing area 22 have absolute values ΔHv1 and ΔHv2, respectively, which represent changes in hardness and differ from each other.

The first hardness changing area 21 ranges from the surface of the frame member 10 to 40% of the entire thickness of the softening layer 20, as shown in FIG. 7. The second hardness changing area 22 continuously extends from the first hardness changing area 21 of the softening layer 20 to the sheet-thickness-direction central section 30 of the frame member 10. That is, the second hardness changing area 22 is an area of the softening layer 20 that is the area different from the first hardness changing area 21.

The absolute value ΔHv1 of the change in hardness of the first hardness changing area 21 is greater than the absolute value ΔHv2 of the change in hardness of the second hardness changing area 22, as shown in FIG. 7. The reason for the above is that the frame member 10 is too soft when ΔHv2 is greater than ΔHv1 so that no sufficient load characteristic is achieved.

The absolute value ΔHv1 of the change in hardness of the first hardness changing area 21 is greater than or equal to 100 Hv but smaller than 200 Hv. When ΔHv1 is greater than or equal to 100 Hv, stress concentration at the time of the bending deformation can be further reduced, whereby the bending characteristics can be further improved. When ΔHv1 is smaller than 200 Hv, the effect of reducing the stress concentration at the time of the bending deformation can be further enhanced, whereby more satisfactory bending characteristics are provided. Therefore, when ΔHv1 is greater than or equal to 100 Hv but smaller than 200 Hv, satisfactory bending characteristics are provided, and the deformation capability of the frame member 10 can be improved. Specifically, a drop in the load immediately after a peak of the load can be moderate in the stroke final stage at the time of collision. The absolute value ΔHv1 of the change in hardness of the first hardness changing area 21 is therefore preferably greater than or equal to 100 Hv but smaller than 200 Hv, as described above.

[Hardness Measurement Method and Hardness Change Calculation Method]

A method for measuring the hardness of the sheet-thickness-direction central section 30 is as follows: A cross section of a sample in the form of a sheet that is a cross section perpendicular to the sheet surface of the sample is collected, and a measurement surface is prepared as a sample under measurement, followed by a hardness test. A method for preparing the measurement surface is carried out in compliant with JIS Z 2244:2009. After any of a #600 silicon carbide sheet to a #1500 silicon carbide sheet is used to polish the measurement surface, and a liquid made of a diluting liquid, such as alcohol, or pure water in which diamond powder having a granularity ranging from 1 to 6 µm is dispersed is used to finish the polished measurement surface into a mirror surface. The hardness test is carried out based on the method specified in JIS Z 2244:2009. A micro Vickers hardness tester is used to measure the hardness of the sample at ten points spaced apart from each other by at least three times the size of the indentation at the depth equal to half the sheet thickness of the sample under a load of 1 kgf, and average the measured values to determine the hardness of the sheet-thickness-direction central section 30.

A method for measuring the hardness of each of the first hardness changing area 21 and the second hardness changing area 22 will next be described. A cross section of a sample in the form of a sheet that is a cross section perpendicular to the sheet surface of the sample is collected, and a measurement surface is prepared as a sample under measurement, followed by a hardness test. To accurately measure the hardness of the portion in the vicinity of the surface of the sample, the measurement surface is so prepared that the amount of irregularities is minimized and no sag is produced in the vicinity of the surface. In the measurement, a cross-section polisher manufactured by JOEL Ltd. is used to perform argon ion beam sputtering on the measurement surface. In this case, to suppress occurrence of stripe-shaped irregularities on the measurement surface, a sample rotating holder manufactured by JOEL Ltd. is used to omnidirectionally irradiate the measurement surface with the argon ion beam.

The micro Vickers hardness tester is used to measure the hardness of the sample having the prepared measurement surface. The hardness of the sample is measured under the load of 1 kgf in the area corresponding to the softening layer of the sample under the surface of the sample at points spaced apart from each other by at least three times the size of the indentation in the direction perpendicular to the sheet surface (sheet thickness direction). In this case, the total number of measurement points varies in accordance with the sheet thickness of the sample. As for the number of measurement points for the calculation of ΔHv1 and ΔHv2, which will be described later, a largest possible number of measurement points are set based on the specification described in JIS Z 2244:2009 with inter-measurement-point intervals large enough to prevent the indentations from affecting the measurement. The measurement position closest to the surface of the sample is set within the area ranging from the sheet surface (when a plated layer is present, immediately below the plated layer or immediately below an alloy layer between the plated layer and the base material) to the depth of 20 µm. The reason for this is that a large amount of soft microstructure is present in a surface portion closest to the surface of the base material.

In the case of a sample in which the softening layer 20 is placed on each side of the sheet-thickness-direction central section 30, the same measurement is performed on the side facing a first surface of the sample and on the side facing a second surface opposite the first surface.

A method for calculating ΔHv1 will next be described. That is, a hardness gradient Δa in the first hardness changing area 21 is calculated by using Expression (1) and all measurement points present in the area from the surface of the sample to a depth corresponding to 40% of the overall thickness of the softening layer (first hardness changing area 21). In Expression (1), $a_i$ represents the ratio (%) of the distance from the surface to the i-th measurement point to the overall thickness of the softening layer, $c_i$ represents the Vickers hardness (Hv) at $a_i$, and n represents the total number of all measurement points present in the area from the surface to the depth corresponding to 40% of the overall thickness of the softening layer (first hardness changing area 21).

[Math. 1]

$$\Delta a = \frac{n \sum_{i=1}^{n} a_i c_i - \sum_{i=1}^{n} a_i \sum_{i=1}^{n} c_i}{\sum_{i=1}^{n} a_i^2 - \left(\sum_{i=1}^{n} a_i\right)^2}$$

Expression (1)

In Expression (1),

Δa: Gradient (Hv/%) of change in hardness in sheet thickness direction in first hardness changing area, $a_i$: Ratio (%) of distance from surface to i-th measurement point to the overall thickness of softening layer, $c_i$: Vickers hardness (Hv) at $a_i$, and n: Total number of all measurement points present in first hardness changing area facing first surface.

In the case of a sample in which the softening layer 20 is placed on each side of the sheet-thickness-direction central section 30, Δa1 on the side facing the first surface is calculated based on the result of the measurement of the hardness on the side facing the first surface, and Δa2 on the side facing the second surface is calculated based on the result of the measurement of the hardness on the side facing the second surface. The arithmetic average of Δa1 and Δa2 can be defined as Δa.

Δa determined by using Expression (1) can be multiplied by the ratio of the sheet-thickness-direction thickness of the first hardness changing area 21 to the overall thickness of the softening layer to determine ΔHv1.

A method for calculating ΔHv2 will next be described. That is, a hardness gradient ΔA in the second hardness changing area 22 is calculated by using Expression (2) and all measurement points present in the area from the depth corresponding to 40% of the overall thickness of the softening layer on the side facing the surface of the sample to the depth corresponding to 100% thereof (second hardness changing area 22). In Expression (2), $A_i$ represents the ratio (%) of the distance from the surface to the i-th measurement point to the overall thickness of the softening layer, $C_i$ represents the Vickers hardness (Hv) at $A_i$, and N represents the total number of all measurement points present in the area from the depth corresponding to 40% of the overall thickness of the softening layer on the side facing the surface to the depth corresponding to 100% thereof (second hardness changing area 22).

[Math. 2]

$$\Delta A = \frac{N \sum_{i=1}^{N} A_i C_i - \sum_{i=1}^{N} A_i \sum_{i=1}^{N} C_i}{\sum_{i=1}^{N} A_i^2 - \left(\sum_{i=1}^{N} A_i\right)^2}$$

Expression (2)

In Expression (2),

ΔA: Gradient (Hv/%) of change in hardness in sheet thickness direction in second hardness changing area, $A_i$: Ratio (%) of distance from surface to i-th measurement point to the overall thickness of softening layer, $C_i$: Vickers hardness (Hv) at $A_i$, and N: Total number of all measurement points present in second hardness changing area facing first surface.

In the case of a sample in which the softening layer 20 is placed on each side of the sheet-thickness-direction central section 30, ΔA1 on the side facing the first surface is calculated based on the result of the measurement of the hardness on the side facing the first surface, and ΔA2 on the side facing the second surface is calculated based on the result of the measurement of the hardness on the side facing the second surface. The arithmetic average of ΔA1 and ΔA2 can be defined as ΔA.

ΔA determined by using Expression (2) can be multiplied by the ratio of the sheet-thickness-direction thickness of the second hardness changing area 22 to the overall thickness of the softening layer to determine ΔHv2.

Actions and Effects

Figure 8:
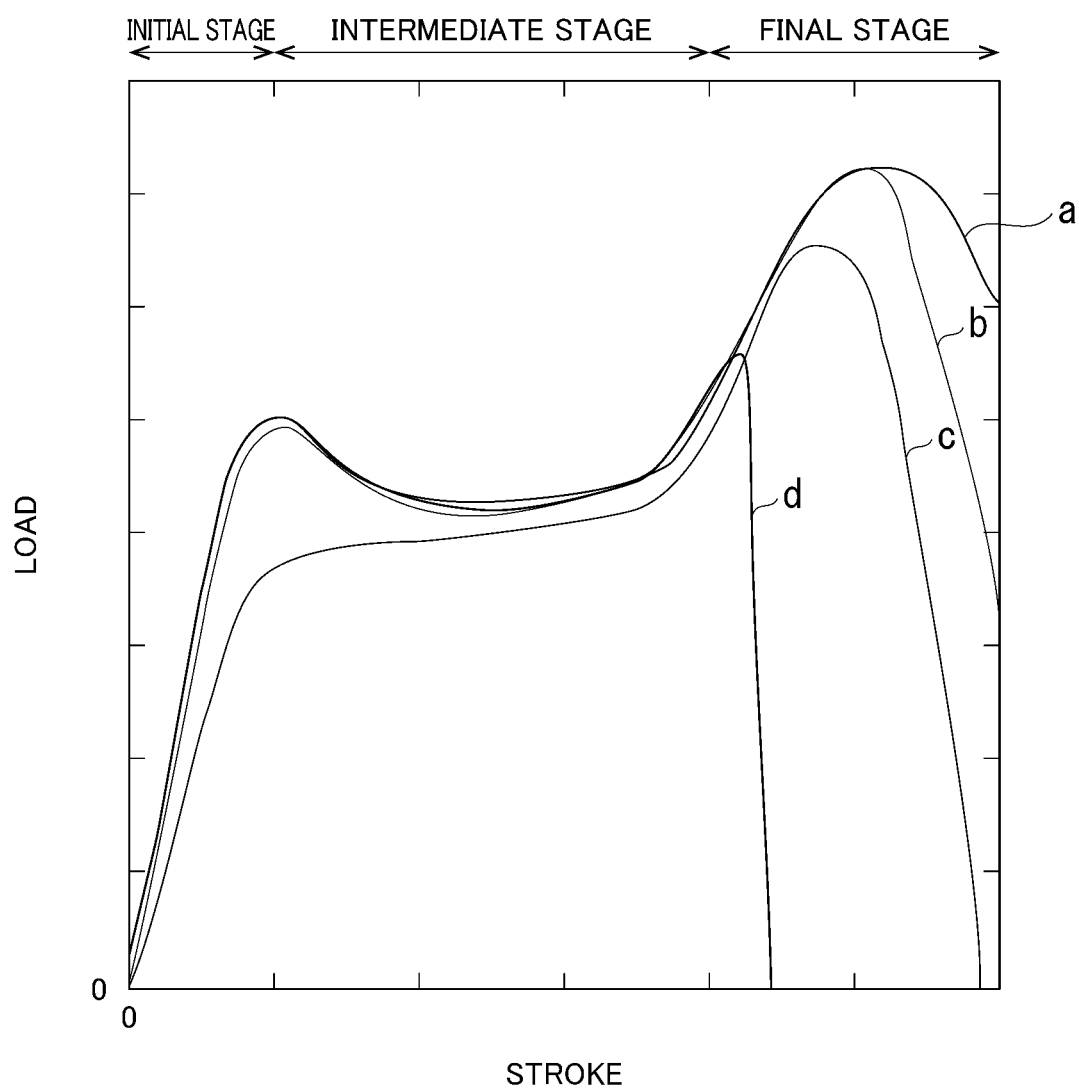
FIG. 8 is a load-stroke diagram for describing an effect of the frame member according to the present embodiment.

FIG. 8 is a load-stroke diagram for describing the actions and effects of the frame member 10 according to the present embodiment.

A curve a is a load-stroke graph under the assumption that a frame member is so configured that an appropriate softening layer is provided, R/t is set at 2.0, and the absolute value ΔHv1 is set at 150 Hv.

A curve b is a load-stroke graph under the assumption that a frame member is so configured that an appropriate softening layer is provided, R/t is set at 2.0, and the absolute value ΔHv1 is set at 70 Hv.

A curve c is a load-stroke graph under the assumption that a frame member is so configured that an appropriate softening layer is provided, R/t is set at 5.0, and the absolute value ΔHv1 is set at 150 Hv.

A curve d is a load-stroke graph under the assumption that a frame member is so configured that no softening layer is provided and R/t is set at 2.0.

The frame member 10 according to the present embodiment, in which R/t is set at 2.5 or smaller and the corner sections 13 and at least part of the side wall sections 15 are each provided with the softening layer 20, allows improvement in the bending characteristics at the time of collision over the range from the stroke initial stage to the stroke final stage, whereby the load can be reduced along a moderate curve in the stroke final stage, as indicated by the curve a or b. That is, the deformation capability can be improved.

Further, since the hardness of the sheet-thickness-direction central section 30 is set at 400 Hv or greater, high load resistance is maintained particularly in the stroke final stage. Moreover, since the absolute value ΔHv1 of the change in hardness of the first hardness changing area is greater than the absolute value ΔHv2 of the change in hardness of the second hardness changing area, a softening portion is provided on the side facing the surface of the frame member 10, whereby the bending characteristics are improved. Further, since ΔHv2 is smaller than ΔHv1, there is no abrupt change in the gradient of the change in the hardness in the sheet thickness direction, whereby the stress concentration is reduced for suppression of breakage and cracking. A drop in the load resistance immediately after a peak in the stroke final stage can be made moderate. Excellent impact resistance characteristics of the frame member 10 can therefore be achieved.

When ΔHv1 ranges from 100 to 200 Hv, the softening portion on the side facing the surface of the frame member 10 is sufficiently ensured, whereby the bending characteristics achieved by the softening layers 20 is sufficiently improved. That is, comparison between the curve a, in which ΔHv1 is 150 Hv, and the curve b, in which ΔHv1 is 70 Hv, shows that the drop in the load resistance immediately after a peak in the stroke final stage can be further moderate because ΔHv1 ranges from 100 to 200 Hv in the curve a.

Further, the frame member 10 according to the present embodiment, in which R/t of the corner sections 13 is set at 2.5 or smaller, allows high load resistance to be maintained over the range from the stroke initial stage to the stroke final stage. In particular, in the stroke final stage, particularly excellent load resistance can be provided in conjunction with the aforementioned effect provided by the formation of the softening layers 20 at the corner sections 13, whereby the deformation capability and the load resistance at the time of collision can be improved.

The frame member 10 according to the present embodiment therefore allows breakage due to collision to be unlikely to occur and the deformation capability to be sufficiently ensured with high load resistance against the collision maintained. As a result, high-level load resistance and bending characteristics can both be achieved as compared with the frame member in the related art.

When an input is externally made to the frame member 10 in the direction of the X-direction component in FIG. 1, that is, when collision occurs to the flat sheet section 11 or a closing plate or any other component bonded to the flange section 17, the side wall sections 15 undergo buckling deformation in some cases. In this case, the softening layer 20 on each of the side wall sections 15 extending from the corner section 13 over the area having a length longer than or equal to half the widthwise length of the side wall section 15 allows effective deformation of the side wall section 15. That is, when external force acts on the frame member 10 due to the collision in the direction of the X-direction component, a portion of the side wall section 15 that is a portion facing the corner section 13 undergoes buckling deformation. The portion includes an area provided with the softening layer 20. The softening layer 20 provided in the area therefore allows the frame member 10 to flexibly bend, whereby small-interval buckling deformation of the side wall section 15 is facilitated. The deformation capability of the frame member 10 can therefore be improved, allowing an increase in energy corresponding to absorbed impact.

Further, providing the softening layer 20 both on the bending inner and outer sides of the corner section 13 further improves the bending characteristics, whereby the deformation capability can be improved.

(Variation 1)

The frame member according to the first embodiment of the present invention has been described above. A variation of the present embodiment will be described with reference to FIG. 9. The present variation is characterized in that the flat sheet section 11, which extends between the corner sections 13 of the frame member 10, includes the softening layer 20.

Figure 9:
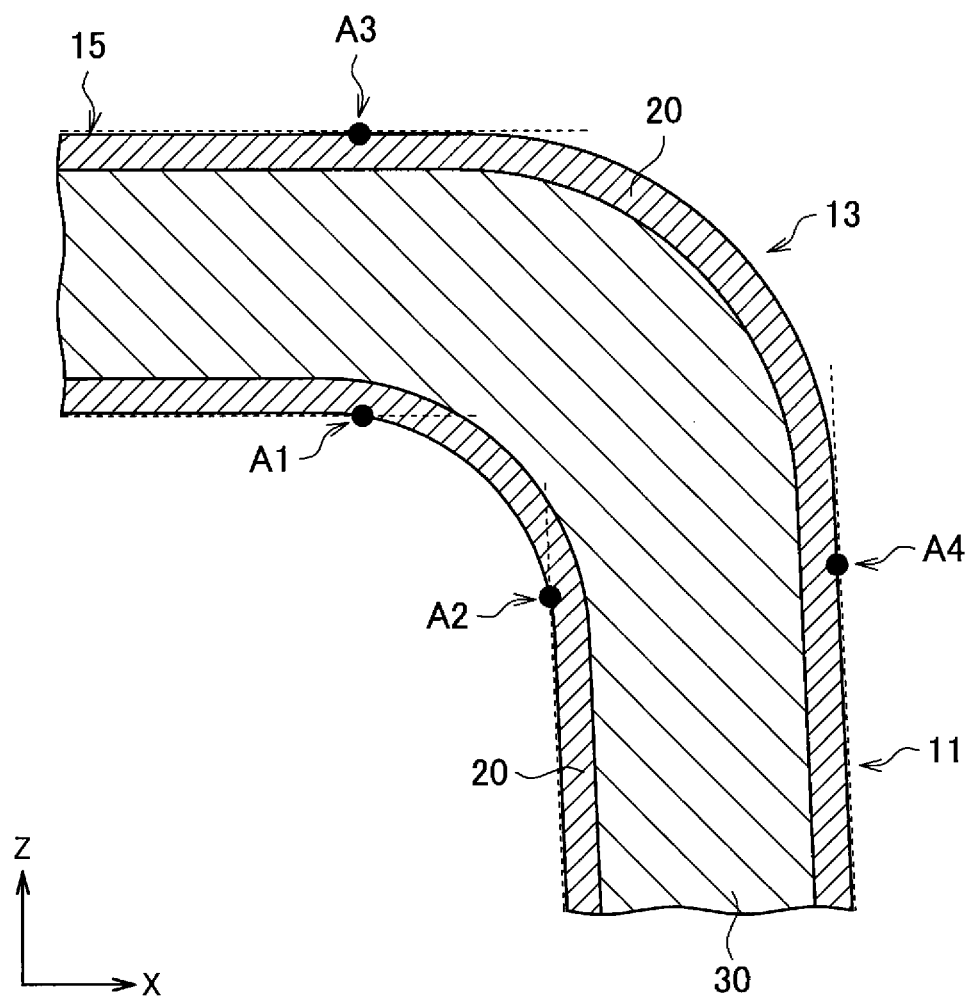
FIG. 9 is a cross-sectional view of an area including a corner section according to a variation of the present embodiment taken along the plane X-Z.

FIG. 9 is a cross-sectional view of an area including a corner section according to a variation of the present embodiment taken along the plane X-Z. The flat sheet section 11 as a second wall section extends from an end of the corner section 13 that is the end opposite the other end of the corner section 13 to which the side wall section 15 as a first wall section extends, and the softening layer 20 is formed also on the flat sheet section 11, as shown in FIG. 9. In the present variation, in which the softening layer 20 is present also on the flat sheet section 11, a surface portion of the flat sheet section 11 is also softened, whereby the bending characteristics and the deformation capability at the time of collision can be improved.

On the flat sheet section 11, the softening layer 20 may be formed over the entire area of the flat sheet section 11. The bending characteristics of the flat sheet section 11 are therefore improved, whereby the deformation capability of the frame member 10 can be further improved.

The configuration in which the softening layer 20 is provided over the entire area of the flat sheet section 11 is also effective in a case where the frame member 10 is used as an impact absorbing frame. The configuration is particularly effective in a case where the input made to the frame member 10 is axial compression. In this case, the load in the lengthwise direction (direction Y shown in FIG. 1) crushes the frame member 10, but the flat sheet section 11, which has the softening layer 20 provided thereacross, buckles, whereby the flat sheet section 11 is unlikely to break.

The softening layer 20 may still instead be provided over the entire area of the flat sheet section 11, the side wall sections 15, and the flange sections 17. The bending characteristics of the entire frame member 10 is therefore improved, whereby the deformation capability of the frame member 10 can be further improved.

(Variation 2)

A variation according to the first embodiment of the present invention has been described above. Another variation of the present embodiment will be described with reference to FIGS. 10 and 11. The present variation is characterized in that a patch member 40 is attached to the bending inner side of each of the corner sections 13.

Figure 10:
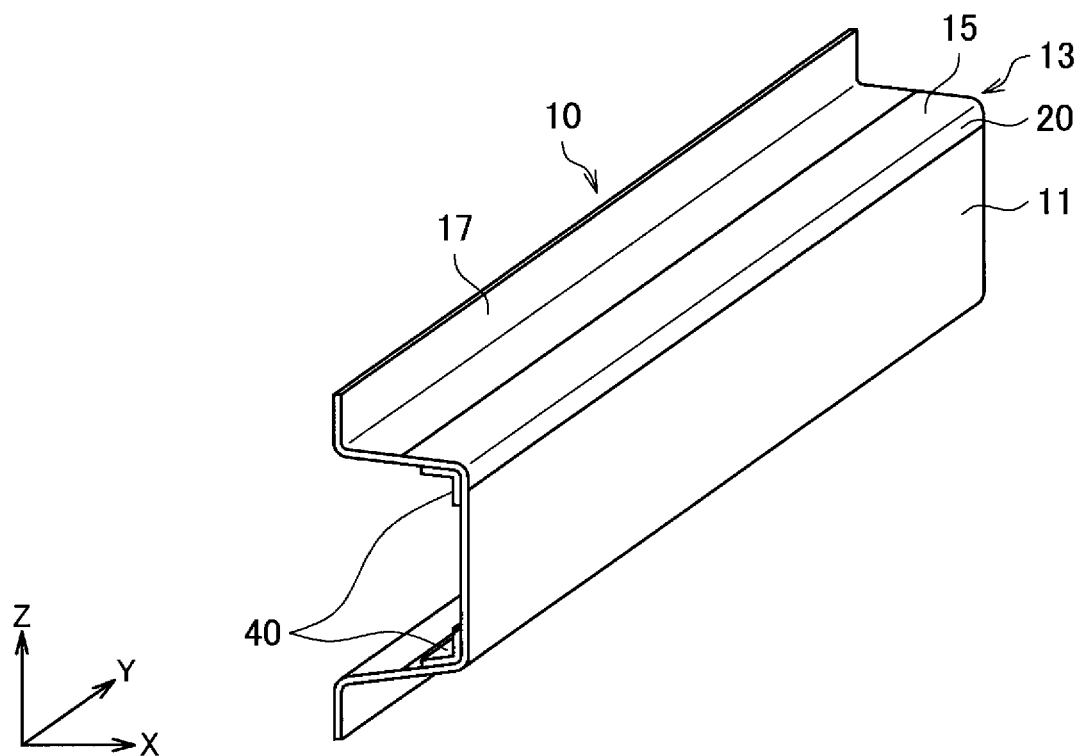
FIG. 10 is a partial perspective view showing an example of a frame member according to another variation of the present embodiment.
Figure 11:
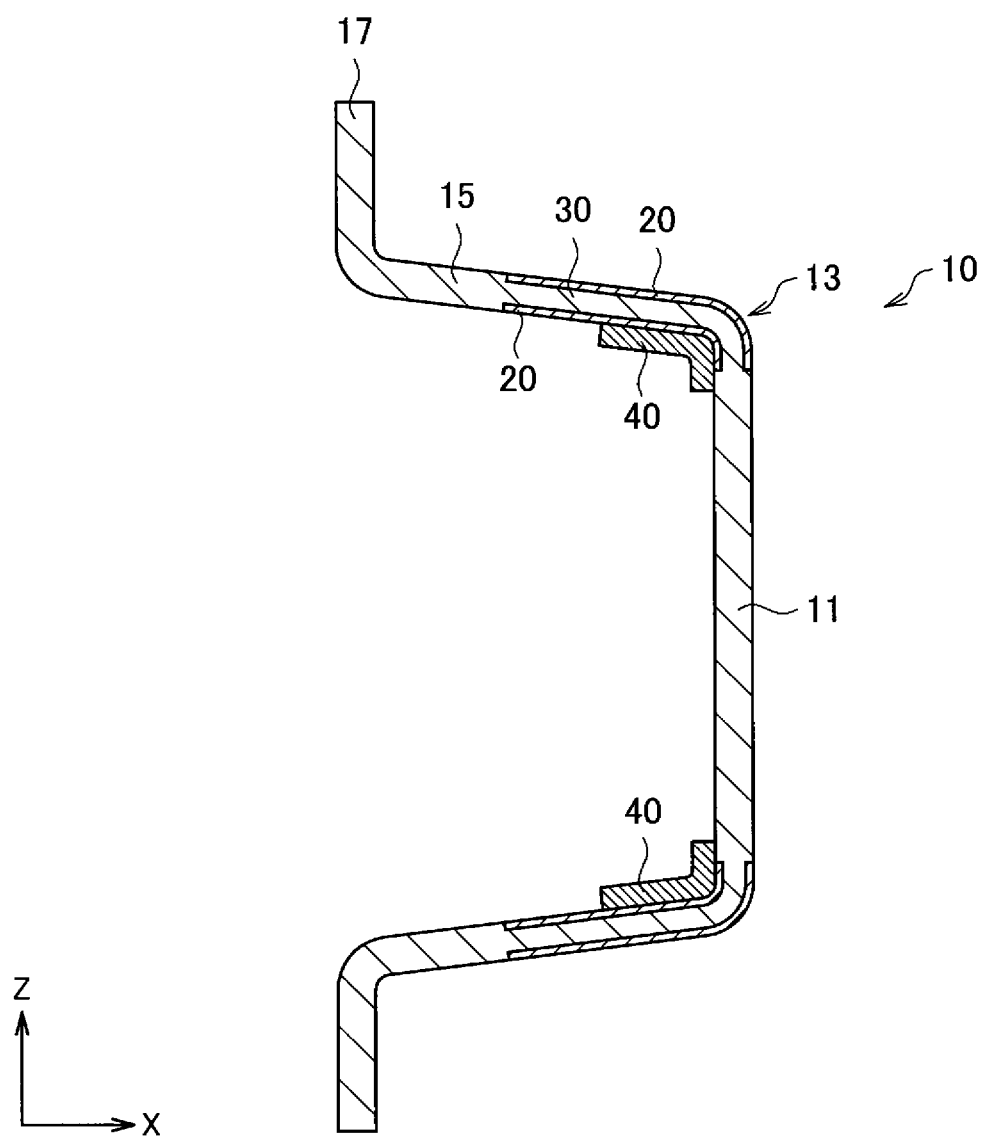
FIG. 11 is a cross-sectional view of the frame member according to the other variation of the present embodiment taken along the plane X-Z.

FIG. 10 is a partial perspective view showing an example of a frame member according to the present variation. FIG. 11 is a cross-sectional view of the frame member according to the present variation taken along the plane X-Z. In the present variation, the patch member 40, which is a part different from the frame member 10, is attached to the bending inner side of each of the corner sections 13, as shown in FIG. 10. The patch members 40 are each a member having an L-letter-shaped cross section, as shown in FIG. 11. The patch members 40 may be made of the same material as that of the frame member 10 or made of a material different from that of the frame member 10. The lengthwise length of the patch members 40 may be the same as or shorter than that of the frame member 10. The patch members 40 are so attached to the frame member 10 as to cover at least the bending inner portions of the corner sections 13. The patch members 40 can be attached to the bending inner sides of the corner sections 13 by using any of a variety of known technologies.

In the present variation, the patch members 40 are attached to the bending inner sides of the corner sections 13 of the frame member 10, whereby the load resistance of the frame member 10 can be further improved.

(Variation 3)

Some variations according to the first embodiment of the present invention have been described above. Another variation of the present embodiment will be described with reference to FIGS. 12A, 12B, 13A, and 13B. The present variation is characterized in that the hardness of the flat sheet section 11 at a depth of 70 μm under the surface in the sheet thickness direction at the center of the flat sheet section 11 is so set as to fall within a predetermined range.

Figure 12A:
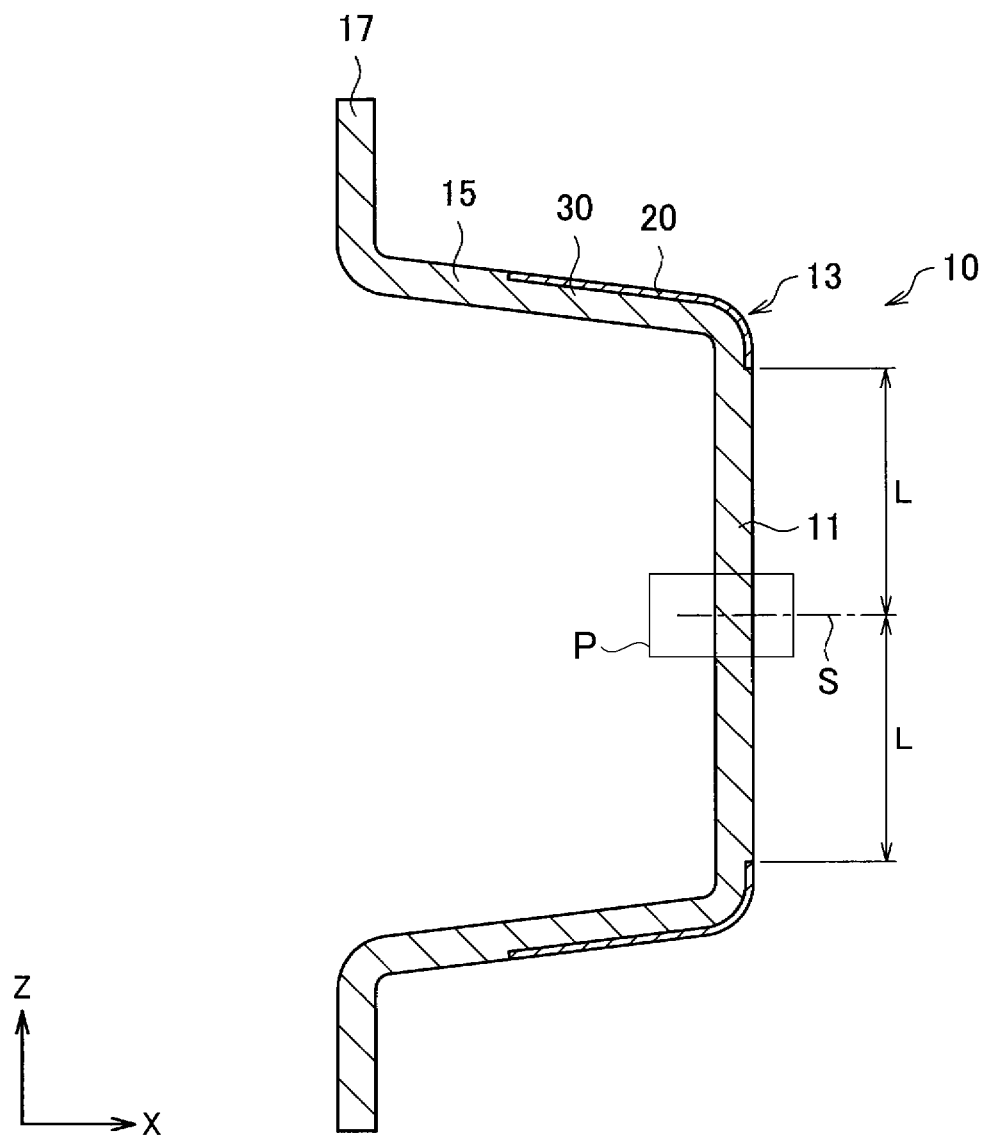
FIG. 12A is a cross-sectional view of the frame member according to the variation taken along the plane X-Z.
Figure 12B:
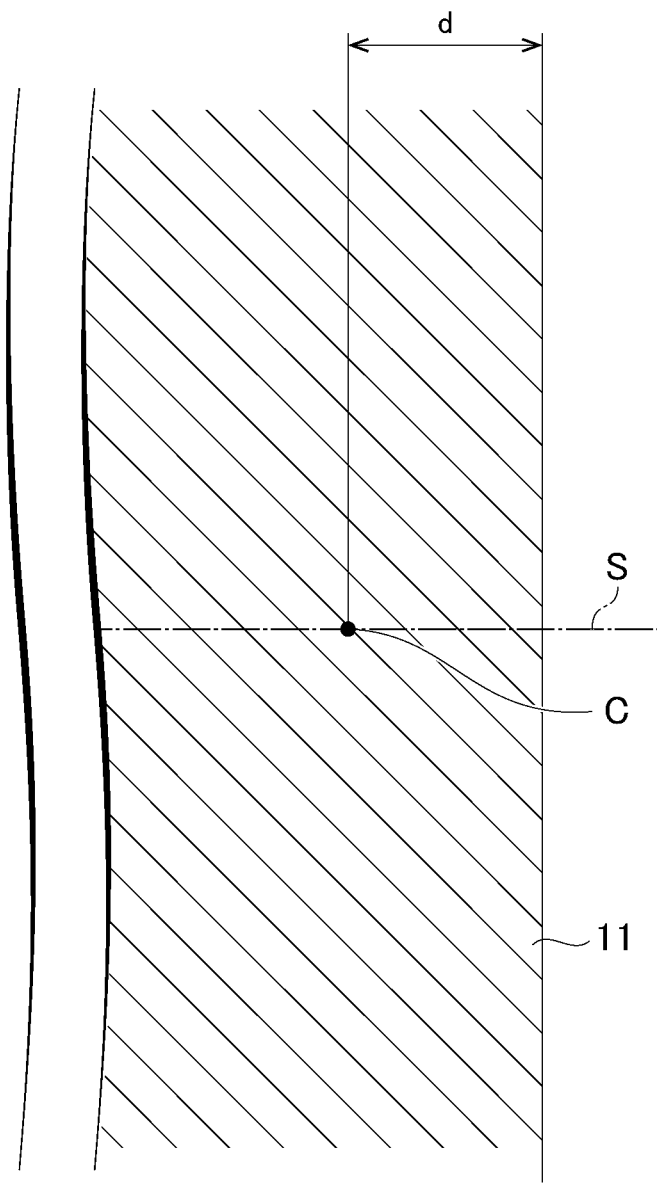
FIG. 12B is an enlarged view of a portion P in FIG. 12A.
Figure 13A:
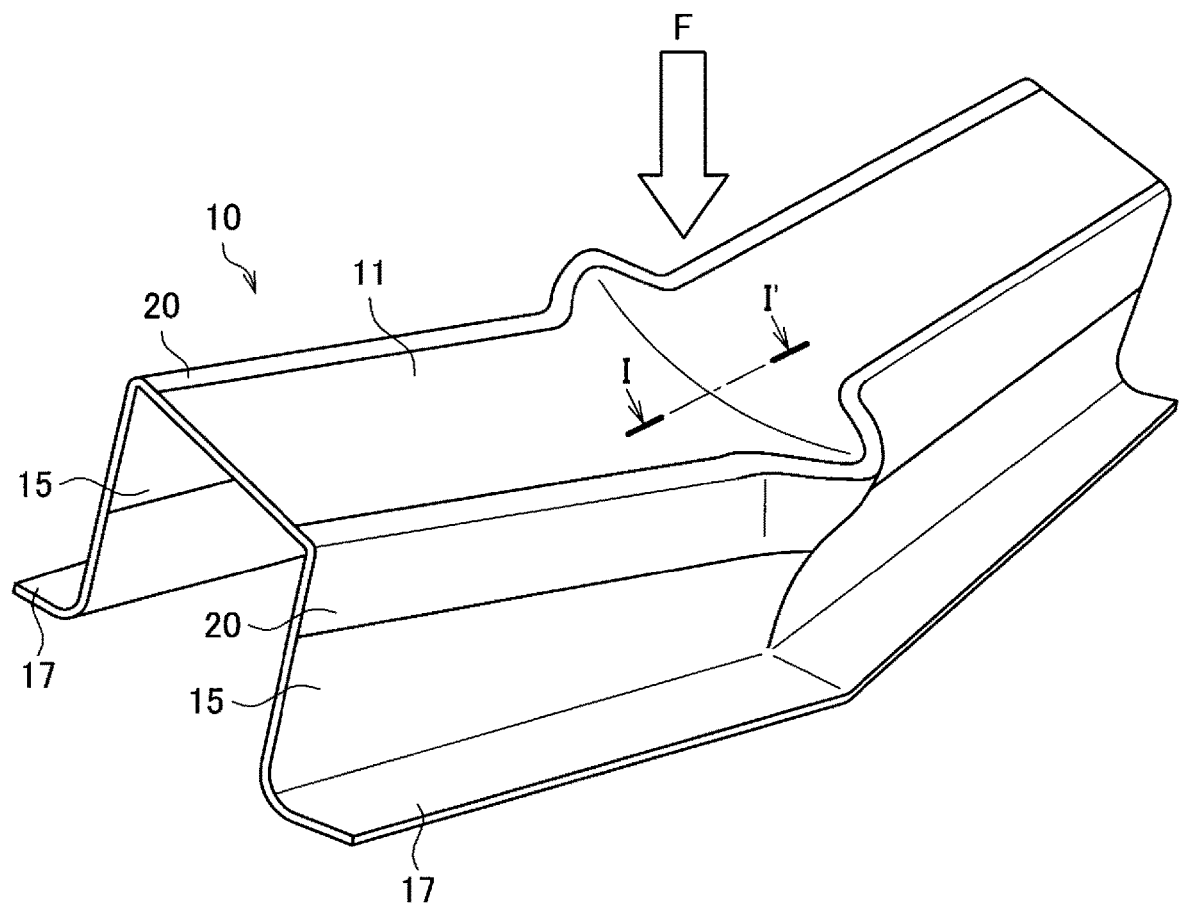
FIG. 13A shows an example of deformation of the frame member according to the variation.
Figure 13B:
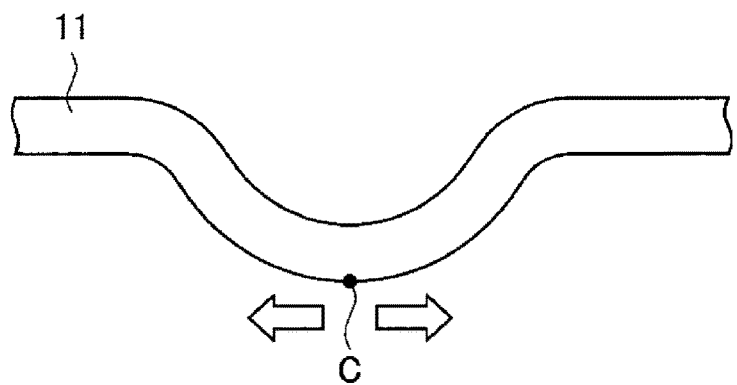
FIG. 13B is a cross-sectional view taken along the line I-I' in FIG. 13A.

FIG. 12A is a cross-sectional view of the frame member 10 according to the present variation taken along the plane X-Z. FIG. 12B is an enlarged view of a portion including a center position S of the flat sheet section 11 (that is, portion P in FIG. 12A) in the cross section of the frame member 10 according to the present variation taken along the plane X-Z. FIG. 13A shows an example of deformation of the frame member 10 according to the present variation. FIG. 13B is a cross-sectional view taken along the line I-I' in FIG. 13A. In the present variation, the hardness in the center position S on the flat sheet section 11 in a frame member widthwise direction (direction X in FIG. 12A) is so set as to fall within a predetermined range, as shown in FIG. 12A. The center position S is the position separate from the widthwise opposite ends of the flat sheet section 11 by the same distance L. The hardness in the position at a predetermined depth under the surface in the center position S is so set as to fall within a predetermined range. A depth (distance in sheet thickness direction) d of a position C where the hardness falls within the predetermined range that is the depth from the surface of the flat sheet section 11 is set at 70 μm, as shown in FIG. 12B. Further, the hardness in the position C is set at a value smaller than or equal to 0.9 times the hardness of the sheet-thickness-direction central section 30 of the flat sheet section 11.

When a load is input to the flat sheet section 11 of the frame member 10, deformation of the flat sheet section 11 starts from the periphery around the center position S, as shown in FIG. 13A. In this process, cracking occurs and progresses in the flat sheet section 11, eventually resulting in breakage of the frame member 10 during the deformation thereof in some cases. Occurrence of breakage during the deformation lowers the amount of energy absorbed by the frame member 10, affecting the impact absorption characteristic.

In particular, when a load is input to the flat sheet section 11 of the frame member 10, the flat sheet section 11 is so deformed as to be locally concave, as shown in FIG. 13B. In this process, a tensile load occurs in the flat sheet section 11, specifically, a portion facing the surface continuously connected to the bending inner side of each of the corner sections 13 (see arrows in FIG. 13B), so that the crack progresses, and breakage is likely to occur.

To solve the problem described above, the present inventors have intensively conducted studies. As a result of the studies, it is found that cracking is likely to occur in an area including the position at the depth of 70 μm under the surface of the flat sheet section 11 in the center position S. In the present variation, the hardness in the position at the depth of 70 μm under the surface of the flat sheet section 11 in the center position S is set at a value smaller than or equal to 0.9 times the hardness of the sheet-thickness-direction central section 30. The hardness is therefore lowered in the center position S of the flat sheet section 11, whereby the progress of the cracking is suppressed. As a result, occurrence of breakage during the deformation of the frame member 10 is suppressed, whereby the amount of energy absorbed by the frame member 10 increases, and the impact absorption characteristic is further improved.

In particular, the hardness in the position on the flat sheet section 11 at the depth of 70 μm under the surface continuously connected to the bending inner side of each of the corner sections 13 is set at a value smaller than or equal to 0.9 times the hardness of the sheet-thickness-direction central section 30. Therefore, in the flat sheet section 11, the hardness of the surface continuously connected to the bending inner side of each of the corner sections 13, where the tensile load that causes the cracking to progress, is controlled. As a result, occurrence of breakage during the deformation of the frame member 10 is suppressed, whereby the amount of energy absorbed by the frame member 10 increases, and the impact absorption characteristic is further improved.

The hardness in the position C where the hardness is controlled may instead be set at a value greater than or equal to 0.1 times the hardness of the sheet-thickness-direction central section 30 of the flat sheet section 11. In this case, high load resistance can be maintained because the hardness ratio in the flat sheet section 11 is set at a value greater than or equal to a predetermined value.

2. Second Embodiment

A frame member according to a second embodiment of the present invention will subsequently be described with reference to FIGS. 14 and 15. The frame member according to the present embodiment differs from the frame member according to the first embodiment in terms of the widthwise cross-sectional shape of the frame member.

Figure 14:
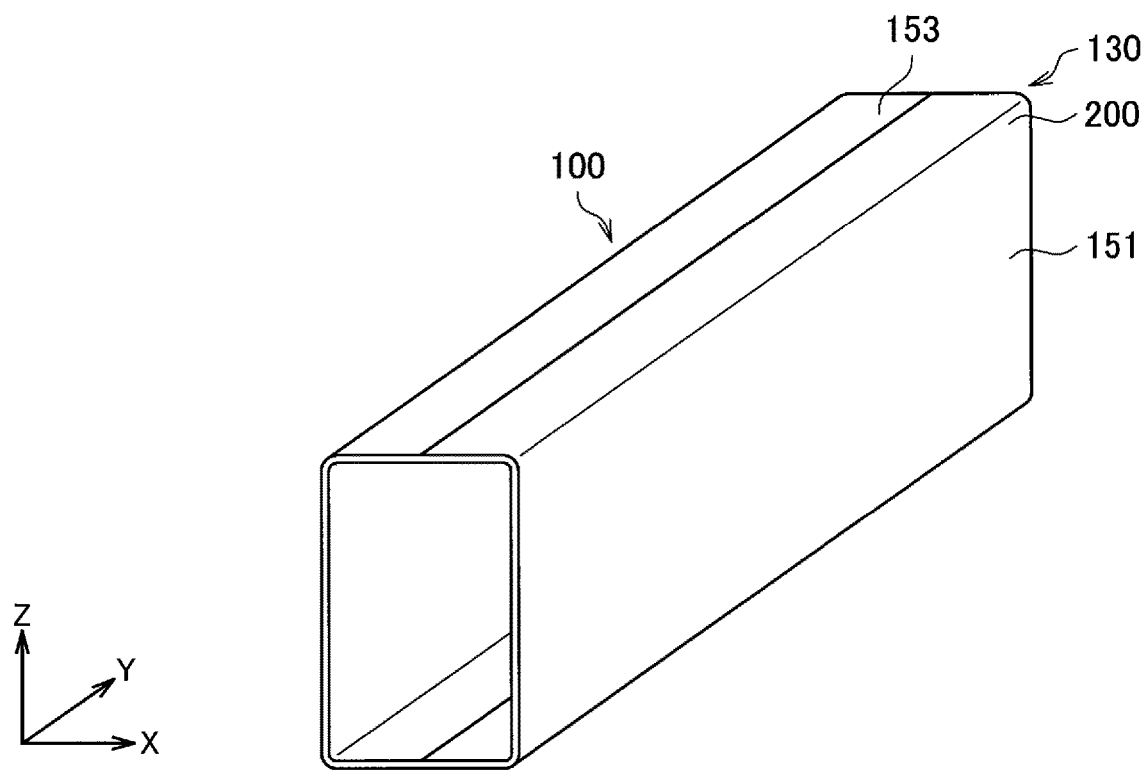
FIG. 14 is a partial perspective view showing an example of a frame member according to a second embodiment of the present invention.
Figure 15:
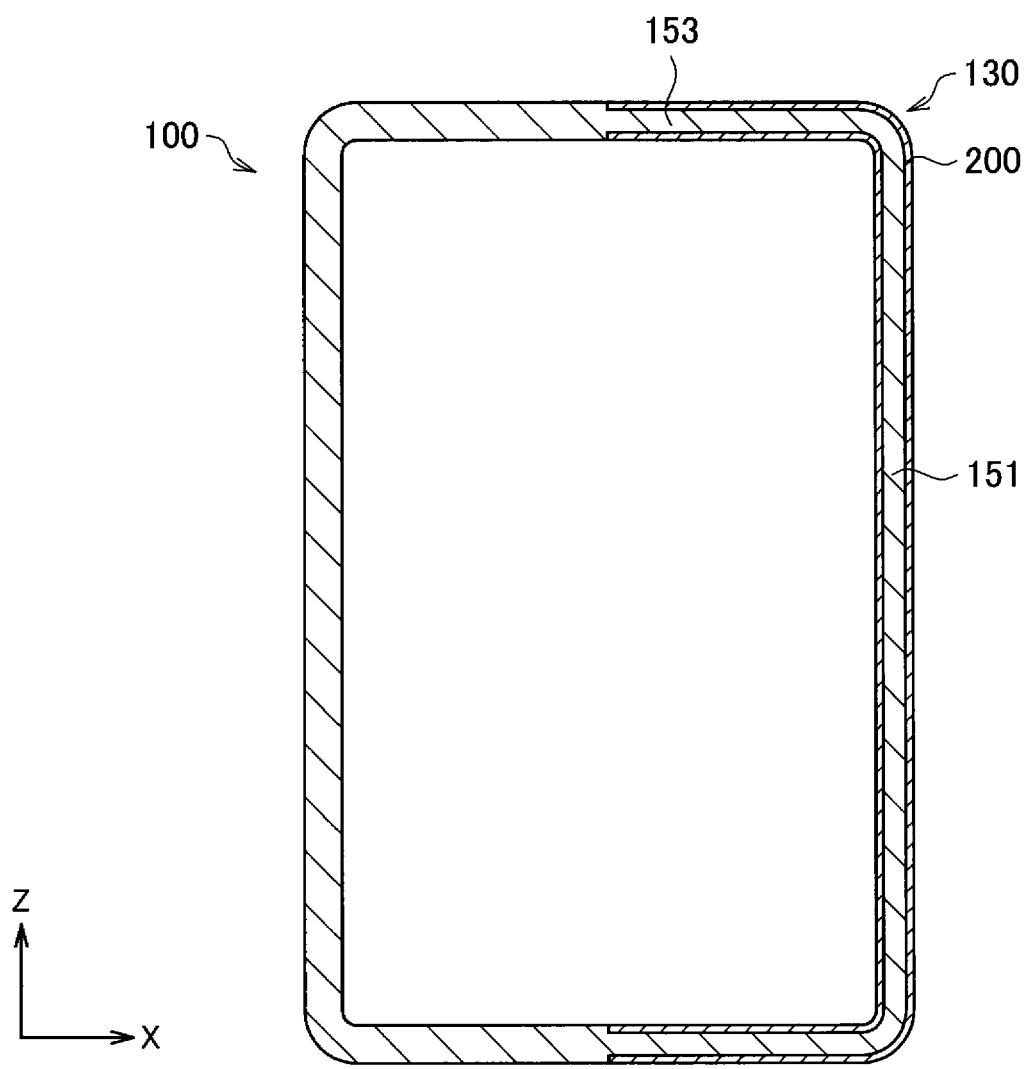
FIG. 15 is a cross-sectional view of the frame member according to the second embodiment taken along the plane X-Z.

FIG. 14 is a partial perspective view showing an example of the frame member according to the present embodiment. FIG. 15 is a cross-sectional view of the frame member according to the present embodiment taken along the plane X-Z. A frame member 100 according to the present embodiment is so configured that the widthwise cross section (in plane X-Z) of the frame member 100 has a closed cross-sectional shape, as shown in FIG. 14. As an example, the frame member 100 is what is called a member having a rectangularly tubular shape, and the frame member 100 has a hollow rectangular cross-sectional shape.

The frame member 100 extends in a direction Y shown in FIG. 14 as a lengthwise direction. The frame member 100 is a member having a hollow rectangular widthwise cross-sectional shape (in plane X-Z), which is a closed cross-sectional shape, as shown in FIG. 15. The frame member 100 includes flat sheet sections 151, side wall sections 153, corner sections 130, which are so bent as to link the flat sheet sections 151 to the side wall sections 153 adjacent thereto. That is, the frame member 100 includes the side wall sections 153, which extend from R-stop-containing ends of the corner sections 130, and the flat sheet sections 151, which extend from the other R-stop-containing ends of the corner sections 130.

In the present embodiment, at least the corner sections 130 include a softening layer 200. All the corner sections 130 do not need to be provided with the softening layer 200, and at least one of the corner sections 130 can be provided with the softening layer 200.

The softening layers 200 extend from the corner sections 130 over the side wall sections 153. The softening layers 200 each extend over the area having a length longer than or equal to half the widthwise length of the side wall section 153. The softening layers 200 may be formed across the entire side wall sections 153.

The softening layers 200 may each extend over the area having a length longer than or equal to half the widthwise length of the flat sheet sections 151. The softening layers 200 may be formed across the entire flat sheet sections 151.

The frame member 100 may be so configured that the softening layers 200 is formed across the entire surface of the frame member 100.

The frame member 100 according to the present embodiment, in which the corner sections 130 and the side wall sections 153 include softening layers 200, allows further improvement in the deformation capability with the load resistance ensured. The portions where the softening layers 200 are provided are selected in accordance with a target to which the frame member 100 is applied.

[Example to which Frame Members According to Embodiments of Present Invention are Applied]

Figure 16:
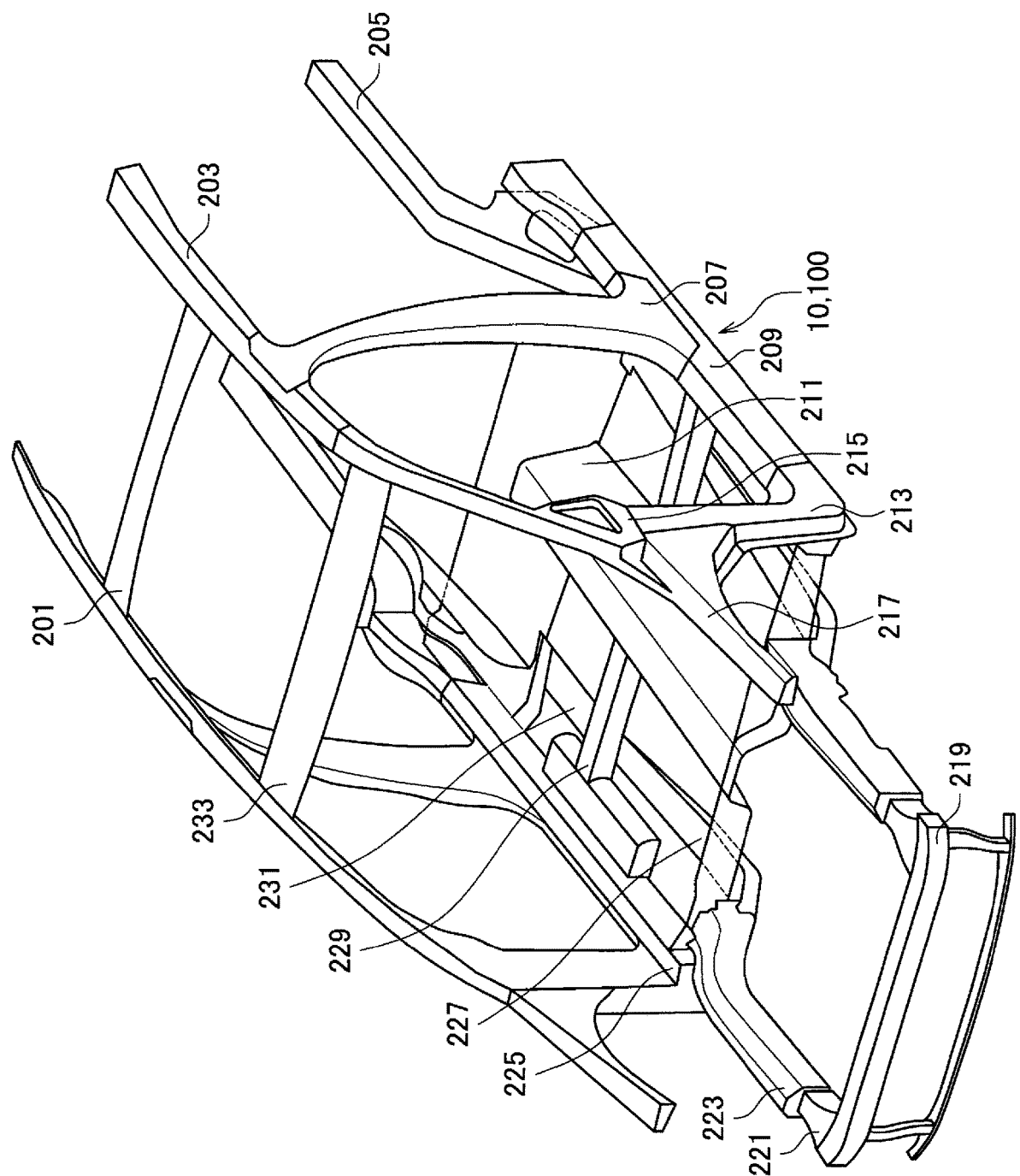
FIG. 16 shows an automobile frame as an example to which any of the frame members according to the embodiments of the present invention is applied.

A preferable embodiment of the present invention has been described above in detail. An example to which the frame members according to the embodiments of the present invention are applied will be described with reference to FIG. 16. FIG. 16 shows an automobile frame as an example to which any of the frame members 10 and 100 according to the embodiments of the present invention is applied. The frame members 10 and 100 can each form the automobile frame as a cabin frame or an impact absorbing frame. Examples to which the frame members 10 and 100 are applied as the cabin frame may, for example, be a roof center reinforcing member 201, a roof side rail 203, a B pillar 207, a side sill 209, a tunnel 211, an A pillar lower member 213, an A pillar upper member 215, a kick reinforcing member 227, a floor cross member 229, an under reinforcing member 231, and a front head 233.

Examples to which the frame members 10 and 100 are applied as the impact absorbing frame may, for example, be a rear side member 205, an apron upper member 217, a bumper reinforcing member 219, a crush box 221, and a front side member 223.

Using the frame member 10 or 100 as the cabin frame or the impact absorbing frame allows reduction in deformation of the frame at the time of collision because the frame members 10 and 100 both have sufficient load resistance. Further, the frame members 10 and 100 have improved deformation capability. Therefore, even when an input, such as side collision, is input to the automobile frame, sufficient deformation of the frame members 10 and 100 can absorb the impact and protect the interior of the frame.

EXAMPLES

A three-point bending/crushing simulation was performed on an automobile structural member. Table 1 below shows the conditions for analysis models used in the simulation and the result of the evaluation.

TABLE 1

| Sample | Shape | Strength (GPa) | R/t | Softening layer Area | Thickness |
|---|---|---|---|---|---|
| Example 1 | Hat | 1.5 | 2.5 | Corner section + side wall | Opposite sides | 17% |
| Example 2 | Hat | 1.5 | 1.8 | Corner section + side wall | Opposite sides | 15% |
| Example 3 | Hat | 1.8 | 1.2 | Corner section + side wall | Opposite sides | 14% |
| Example 4 | Hat | 2.0 | 1.5 | Corner section + side wall | Opposite sides | 16% |

TABLE 1-continued

| | | | | | | |
|---|---|---|---|---|---|---|
| Example 5 | Rectangular tube | 1.5 | 2.0 | Entirety | Opposite sides | 15% |
| Example 6 | Hat | 1.5 | 2.0 | Corner section + side wall + flat sheet | Opposite sides | 11% |
| Example 7 | Hat | 1.5 | 0.9 | Corner section + side wall | Opposite sides | 12% |
| Example 8 | Hat | 1.5 | 2.5 | Corner section + side wall | Opposite sides | 14% |
| Example 9 | Hat | 1.5 | 2.0 | Corner section + side wall | One side | 16% |
| Comparative Example 1 | Hat | 1.5 | 5.0 | | No softening layer | |
| Comparative Example 2 | Rectangular tube | 1.5 | 5.0 | | No softening layer | |
| Comparative Example 3 | Hat | 1.5 | 5.0 | Corner section | Opposite sides | 17% |
| Comparative Example 4 | Hat | 1.5 | 5.0 | Corner section + side wall | Opposite sides | 1% |
| Comparative Example 5 | Hat | 1.5 | 3.0 | Corner section + side wall | Opposite sides | 28% |
| Comparative Example 6 | Hat | 1.5 | 5.0 | Corner section + side wall | Opposite sides | 16% |
| Comparative Example 7 | Hat | 1.5 | 5.0 | Corner section + side wall | Opposite sides | 16% |
| Comparative Example 8 | Hat | 1.5 | 3.0 | Corner section + side wall | Opposite sides | 17% |
| Comparative Example 9 | Hat | 1.5 | 8.5 | Corner section + side wall | Opposite sides | 16% |
| Comparative Example 10 | Hat | 1.5 | 8.5 | Corner section + side wall | Opposite sides | 17% |
| Comparative Example 11 | Hat | 1.5 | 5.0 | Corner section + side wall | Opposite sides | 15% |
| Comparative Example 12 | Hat | 1.5 | 2.0 | | No softening layer | |

| | Softening layer | | | Evaluation | | |
|---|---|---|---|---|---|---|
| Sample | ΔHv1 | ΔHv2 | Hardness at surface/hardness in central section | Load characteristic | Energy absorption characteristic | Whether or not breakage has occurred |
| Example 1 | 90 | 70 | 0.6 | B | A | No |
| Example 2 | 160 | 90 | 0.7 | A | A | No |
| Example 3 | 120 | 100 | 0.5 | A | A | No |
| Example 4 | 150 | 70 | 0.6 | A | A | No |
| Example 5 | 130 | 90 | 0.6 | A | A | No |
| Example 6 | 140 | 70 | 0.6 | A | A | No |
| Example 7 | 130 | 80 | 0.6 | A | A | No |
| Example 8 | 150 | 70 | 0.6 | A | A | No |
| Example 9 | 140 | 70 | 0.6 | A | A | No |
| Comparative Example 1 | | No softening layer | | E | C | Yes |
| Comparative Example 2 | | No softening layer | | E | C | Yes |
| Comparative Example 3 | 120 | 90 | 0.6 | E | C | Yes |
| Comparative Example 4 | 150 | 140 | 0.5 | E | C | Yes |
| Comparative Example 5 | 110 | 100 | 0.8 | E | C | No |
| Comparative Example 6 | 140 | 170 | 0.6 | E | C | No |
| Comparative Example 7 | 120 | 100 | 0.2 | E | C | No |
| Comparative Example 8 | 90 | 70 | 0.95 | E | C | Yes |
| Comparative Example 9 | 80 | 60 | 0.8 | D | B | No |
| Comparative Example 10 | 150 | 100 | 0.6 | D | B | No |
| Comparative Example 11 | 160 | 90 | 0.6 | C | B | No |
| Comparative Example 12 | | No softening layer | | D | C | Yes |

"Hat" and "Rectangular tube" were used as the shapes in the analysis models. "Hat" means a closed-cross-section, hat-shaped member having a closed cross section formed by bonding a closing plate to the flange sections 17 of the frame member 10 shown in FIGS. 1 and 4. "Rectangular tube" means a rectangular member, such as that shown in FIGS. 14 and 15. The lengthwise length of the "Hat" and "Rectangular tube" was set at 500 mm. The height of the models (corresponding to height of side wall sections 15 and 153) was set at 60 mm, and the widthwise length of the models (corresponding to widthwise length of flat sheet sections 11 and 151) was set at 80 mm. The sheet thickness was set at 1.6 mm.

The tensile strength in the models was set at 1.5 GPa, 1.8 GPa, and 2.0 GPa. The areas where the softening layers are provided mean the areas corresponding to the corner sections 13 and 130 in the case of "Hat". "Side wall" means the portion from an R-stop of the corner section 13 to the area having a length equal to half the widthwise length of the side wall section 15, as shown in FIG. 3. "Flat sheet" means the portion from an R-stop of the corner section 130 to the area having a length equal to half the widthwise length of the flat sheet section 151. "Entirety" includes the corner sections and means that the softening layer is provided across the entire surface. "Opposite sides" means that the softening layers are provided on opposite sides, and "One side" means that the softening layer is provided on the bending outer surface of a corner section.

Table 1 also shows R/t, the thickness of the softening layer, ΔHv1, ΔHv2, and the ratio of the hardness at the surface to the hardness in the central section.

The three-point bending/crushing simulation was performed on the analysis models. Table 1 shows the result of the simulation.

On the side opposite the flat sheet sections 11 and 151 of the frame members 10 and 100, the frame members 10 and 100 were supported with the inter-support-point distance set at 600 mm, and an impactor having a radius of 150 mm was pushed against the flat sheet sections 11 and 151 in a quasi-static manner. The push-in amount of the impactor and the load resulting from the pushing operation were calculated to provide the amount of absorbed energy. Further, evaluation was also performed on whether or not the side wall sections have broken in the stroke intermediate stage, which will be described later, at the time of the pushing operation. Evaluation references of the load characteristic, which is an index of the load resistance, and the energy absorption characteristic, which is an index of the load resistance and the deformation capability, are as follows.

Load Characteristic:
- A: A first peak is present in the stroke initial stage. High load resistance is maintained for the stroke intermediate and final stages. A second peak is present in the stroke final stage. After the second peak, the load resistance gently decreases.
- B: A first peak is present in the stroke initial stage. High load resistance is maintained for the stroke intermediate and final stages. A second peak is present in the stroke final stage.
- C: A high load is maintained for the stroke intermediate and final stages. A peak is present in the stroke final stage.
- D: A high load is maintained for the stroke intermediate and final stages.
- E: The load is maintained low in each of the stages, or occurrence of breakage causes the maximum load to be low.

A to C represent acceptance levels.

Energy Absorption Characteristic:
- A: A level that allows sufficient energy absorption as a result of high load maintained over the entire stroke.
- B: A level that does not allow sufficient energy absorption as a result of no high load maintained over the entire stroke.
- C: A level that causes a low load to be maintained over the entire stroke or does not allow sufficient energy absorption due to occurrence of breakage.

A represents an acceptance level.

In Examples 1 to 9, a peak was present in each of the stroke initial and final stages, and a sufficiently satisfactory load characteristic and an energy absorption characteristic were provided as a whole, as shown in Table 1.

In Example 9, a sufficiently satisfactory load characteristic and an energy absorption characteristic were provided even when the softening layer was provided only on one side.

Figure 17:
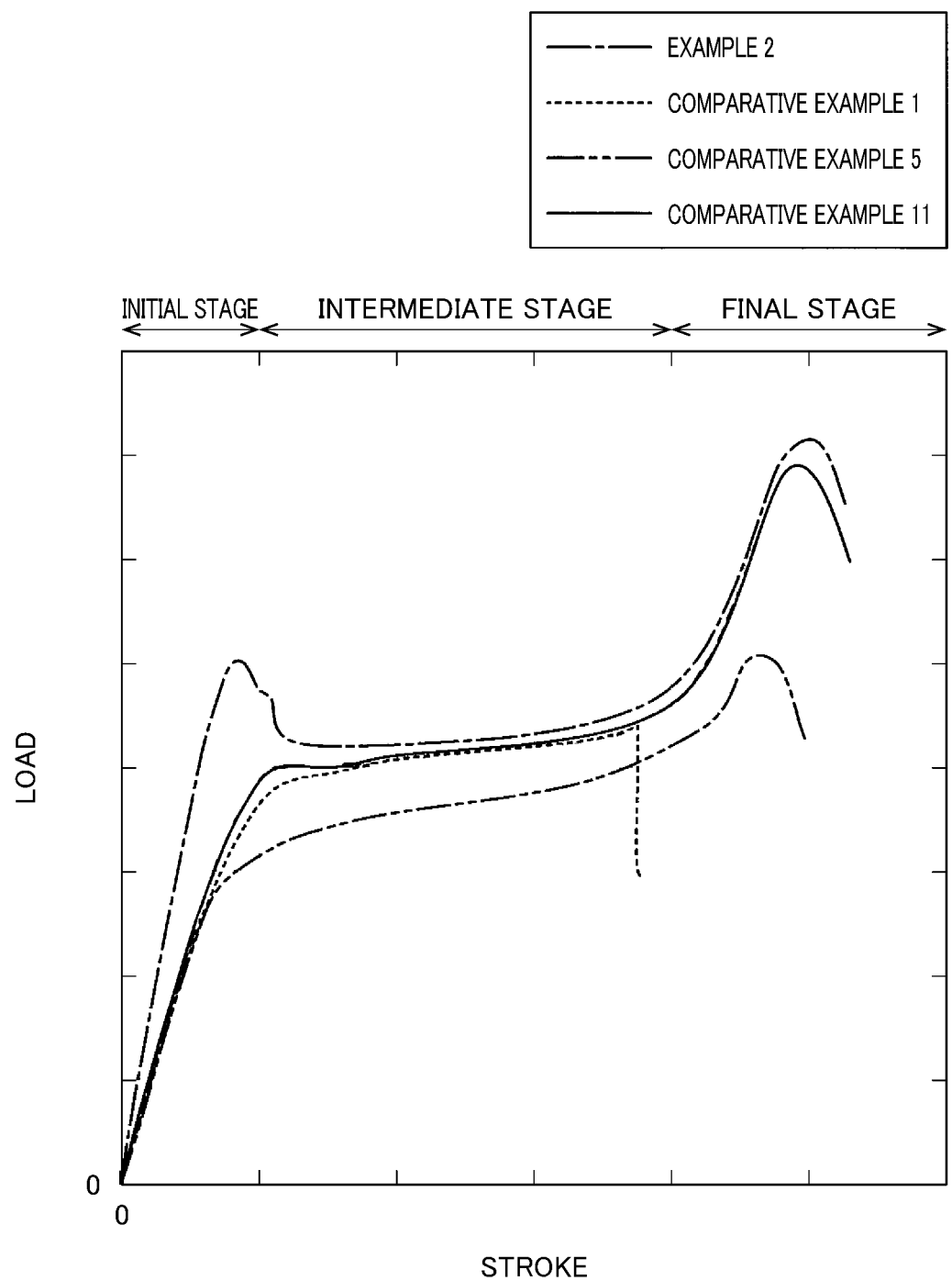
FIG. 17 is an example of a load-stroke diagram obtained as a result of a simulation according to an example of the present invention.

FIG. 17 is an example of the load-stroke diagram obtained as a result of the simulation according to the present example. For example, in Example 2, a first peak was present in the stroke initial stage, high load resistance was maintained for the stroke intermediate and final stages, and a second peak was present in the stroke final stage, as shown in FIG. 17. In Comparative Example 11, in which R/t was 5.0, no peak was present in the stroke initial stage. Further, although the softening layers are present, the second peak in the stroke final stage is lower than that in Example 2.

On the other hand, in Comparative Examples 1 and 2, in which no softening layer was provided, breakage occurred before a theoretically expected maximum load was reached. A sufficiently satisfactory load characteristic and an energy absorption characteristic was therefore not provided.

In Comparative Example 3, in which only the corner sections were provided with the softening layers, breakage occurred before the maximum load was reached. A sufficiently satisfactory load characteristic and an energy absorption characteristic was therefore not provided.

In Comparative Example 4, in which the provided softening layers accounted only for 1% of the sheet thickness, breakage occurred before the maximum load was reached. A sufficiently satisfactory load characteristic and an energy absorption characteristic was therefore not provided.

In Comparative Examples 5 to 7, in which a large amount of softening layers was softened, no breakage occurred, but a sufficiently large load could not be maintained. As a result, a sufficiently satisfactory energy absorption characteristic was not provided.

In Comparative Example 8, in which the hardness at the surface was not sufficiently smaller than the hardness in the central section, breakage occurred in the side wall sections before the maximum load was reached. As a result, a sufficiently satisfactory load characteristic and an energy absorption characteristic was not provided.

In Comparative Examples 9 to 11, in which R/t was greater than 2.5, a high load could not be maintained over the stroke initial to final stages.

In Comparative Example 12, in which R/t was smaller than or equal to 2.5 but no softening layer was provided, breakage occurred in the stroke final stage, and a high maximum load could not be ensured. As a result, a sufficiently satisfactory load characteristic and an energy absorption characteristic was not provided.

Referring to FIG. 17, in Comparative Example 1, breakage occurred in the stroke intermediate stage, and no maximum load was therefore provided. In Comparative Example 5, a sufficiently large load could not be maintained although no breakage occurred down to the stroke final stage.

Further, to evaluate the performance of the frame member having controlled hardness in the center position S, the three-point bending/crushing simulation was performed on the automobile structural member. Table 2 below shows the conditions for analysis models used in the simulation.

TABLE 2

| Sample | Shape | Strength (GPa) | R/t | Softening layer Area | | Thickness | ΔHv1 | ΔHv2 | Softening layer Hardness at surface/hardness in central section |
|---|---|---|---|---|---|---|---|---|---|
| Reference Example 1 | Hat | 1.5 | 5.0 | Corner section + side wall | Opposite sides | 15% | 160 | 90 | 0.6 |
| Reference Example 2 | Hat | 1.5 | 1.8 | Corner section + side wall | Opposite sides | 15% | 160 | 90 | 0.7 |
| Example 10 | Hat | 1.5 | 1.8 | Corner section + side wall | Opposite sides | 15% | 160 | 90 | 0.7 |
| Example 11 | Hat | 1.5 | 1.8 | Corner section + side wall | Opposite sides | 15% | 160 | 90 | 0.7 |
| Example 12 | Hat | 1.5 | 1.8 | Corner section + side wall | Opposite sides | 15% | 160 | 90 | 0.7 |

| Sample | Distribution of hardness in center position S Depth from surface | Surface | Hardness in center position S/hardness in central section | Evaluation Whether or not breakage has occurred in side wall section | Whether or not breakage has occurred in flat sheet |
|---|---|---|---|---|---|
| Reference Example 1 | — | — | 1 | No | Yes |
| Reference Example 2 | — | — | 1 | No | Yes |
| Example 10 | 70 μm | Outer side | 0.8 | No | No |
| Example 11 | 70 μm | Inner side | 0.85 | No | No |
| Example 12 | 70 μm | Both sides | 0.86 | No | No |

The descriptions of the shape, tensile strength, R/t, and softening layers in Table 2 are the same as those in Table 1. In Table 2, as for the distribution of the hardness in the central position S, the depth from the surface represents the depth d in FIG. 12B. In a case where the hardness in a position at a predetermined depth from the surface continuously connected to the bending inner side of a corner section is controlled, the surface is called the "inner side", whereas in a case where the hardness in a position at a predetermined depth from the surface continuously connected to the bending outer side of a corner section is controlled, the surface is called the "outer side". In a case where the hardness control is performed in a position at a predetermined depth from the two surfaces described above, the surface is called the "both sides". Table 2 further shows the ratio of the hardness in the position C at the predetermined depth in the central position S to the hardness in the sheet-thickness-direction central section 30.

A simulation was performed on the analysis models under the same conditions as those for the three-point bending/crushing simulation performed on the analysis models in Table 1. Table 2 also shows the results of the evaluation. The evaluation references are the same as the evaluation references in Table 1.

In Examples 10 to 12, in which the hardness was controlled at the predetermined depth in the central position S in the flat sheet section 11, no breakage occurred in the flat plat, as shown in Table 2. On the other hand, in Reference Examples 1 and 2, in which the hardness was not controlled in the central position S in the flat sheet section 11, breakage occurred in the flat sheet section 11 in the deformation final stage.

Figure 18:
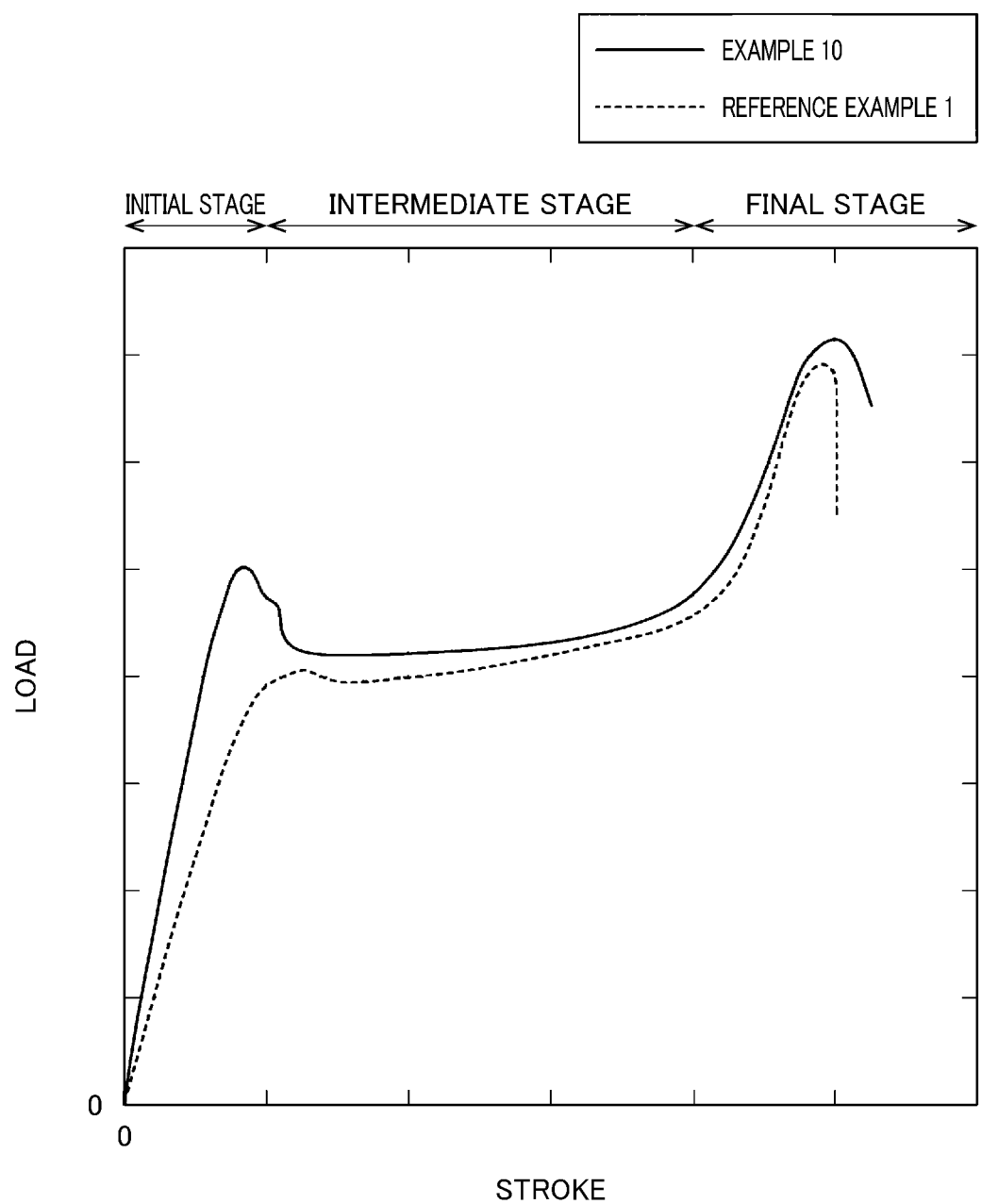
FIG. 18 is an example of a load-stroke diagram obtained as a result of a simulation according to an example of the present invention.

FIG. 18 is an example of the load-stroke diagram obtained as a result of the simulation according to the examples shown in Table 2. In Example 10, a high load was maintained over the stroke final stage, and a second peak was present in the stroke final stage, as shown in FIG. 18.

On the other hand, in Reference Example 1, a high peak was present in the stroke final stage, but the flat sheet section 11 was broken in the middle of the stroke final stage, and a high load could not be maintained down to the end of the stroke final stage, as compared with Example 10. The frame member having controlled hardness in the center position S therefore allows a high load to be maintained down to the end of the stroke final stage and provides a higher impact absorption characteristic.

Preferable embodiments of the present invention have been described above with reference to the accompanying drawings, but the present invention is not limited thereto. It is apparent that a person who has typical knowledge in the technical field to which the present invention belongs can realize a variety of changes or modifications within the technical idea category set forth in the claims, and it is understood that the changes or modifications also naturally belong to the technical scope of the present invention.

INDUSTRIAL APPLICABILITY

The present invention provides a frame member that allows improvement both in deformation capability and load resistance at the time of collision.

BRIEF DESCRIPTION OF THE REFERENCE SYMBOLS

10: Frame member
11: Flat sheet section
13: Corner section
15: Side wall section
17: Flange section
20: Softening layer
21: First hardness changing area
22: Second hardness changing area
30: Sheet-thickness-direction central section

What is claimed is:

1. A frame member comprising a corner section extending in a lengthwise direction and a side wall section extending from a widthwise end of the corner section,
wherein a softening layer is provided in a sheet thickness direction so as to present on a surface of the corner section on at least one of a bending inner side and a bending outer side,
the softening layer extends along the side wall section from the corner section to an area having a length longer than or equal to half a widthwise length of the side wall section,
hardness of a sheet-thickness-direction central section in a portion where the softening layer is provided is greater than or equal to 400 Hv, and the softening layer is an area having hardness smaller by at least 10 Hv than the hardness of the sheet-thickness-direction central section in the portion where the softening layer is provided,
a thickness of the softening layer is greater than or equal to 2% of the sheet thickness in the portion where the softening layer is provided but smaller than 20% of the sheet thickness in the portion where the softening layer is provided,
the hardness of the softening layer at the surface is greater than or equal to 0.5 times the hardness of the sheet-thickness-direction central section in the portion where the softening layer is provided but smaller than 0.9 times the hardness of the sheet-thickness-direction central section in the portion where the softening layer is provided,
the softening layer has a first hardness changing area that is an area extending from the surface to 40% of the thickness of the softening layer in the sheet thickness direction and a second hardness changing area that is an area different from the first hardness changing area out of the softening layer,
an absolute value $\Delta Hv1$ of a change in hardness of the first hardness changing area in the sheet thickness direction is greater than an absolute value $\Delta Hv2$ of a change in hardness of the second hardness changing area in the sheet thickness direction, and
$R/t \leq 2.5$ is satisfied, where R represents a bending radius of the corner section, and t represents the sheet thickness of the corner section.

2. The frame member according to claim 1, wherein the absolute value $\Delta Hv1$ of a change in hardness of the first hardness changing area in the sheet thickness direction is greater than or equal to 100 Hv but smaller than 200 Hv.

3. The frame member according to claim 1, wherein the softening layer is provided on the bending outer side of the corner section.

4. The frame member according to claim 1, wherein the softening layer is provided both on the bending inner side and the bending outer side of the corner section.

5. The frame member according to claim 1,
wherein the side wall section extends from one end of the corner section,
the frame member further comprises a flat sheet section extending from another end of the corner section, and
the softening layer extends along the flat sheet section from the corner section to an area having a length longer than or equal to half a widthwise length of the flat sheet section.

6. The frame member according to claim 1,
wherein the side wall section extends from one end of the corner section,
the frame member further comprises a flat sheet section extending from another end of the corner section, and
hardness in a position at a depth of 70 μm from a surface of the flat sheet section in the sheet thickness direction at a center of the flat sheet section is smaller than or equal to 0.9 times the hardness in the central section in the sheet thickness direction.

7. The frame member according to claim 6, wherein the surface of the flat sheet section is a surface of the flat sheet section that is a surface continuously connected to the bending inner side of the corner section.

* * * * *